(12) United States Patent  (10) Patent No.: US 7,108,918 B2
Yabuki  (45) Date of Patent: *Sep. 19, 2006

(54) OPTICAL FILTER HAVING FILTER LAYER CONTAINING INFRARED ABSORBING DYE AND ULTRAVIOLET ABSORBING AGENT

(75) Inventor: Yoshiharu Yabuki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/031,034

(22) Filed: Jan. 10, 2005

(65) Prior Publication Data

US 2005/0151454 A1 Jul. 14, 2005

Related U.S. Application Data

(62) Division of application No. 09/978,029, filed on Oct. 17, 2001, now Pat. No. 6,875,512.

(30) Foreign Application Priority Data

Oct. 17, 2000 (JP) .............. 2000-316966

(51) Int. Cl.
- *B32B 27/20* (2006.01)
- *F21V 9/04* (2006.01)
- *F21V 9/06* (2006.01)
- *G02B 5/20* (2006.01)
- *H01J 11/02* (2006.01)

(52) U.S. Cl. ............... 428/411.1; 252/587; 252/588; 359/361; 359/885; 359/892; 430/512; 430/517

(58) Field of Classification Search ............... None
See application file for complete search history.

(56) References Cited

U.S. PATENT DOCUMENTS 5,498,345 A 3/1996 Jollenbeck et al.

(Continued)

Primary Examiner—D. S. Nakarani
(74) Attorney, Agent, or Firm—Buchanan Ingersoll PC

(57) ABSTRACT

An optical filter comprises a transparent support and a filter layer. The filter layer contains a dye and a binder polymer. The dye is in an aggregated form exhibiting an absorption maximum in the wavelength region of 750 to 1,100 nm. The support, the filter layer or an optional layer contains an ultraviolet absorbing agent represented by the formula (I), (II), (III) or the like.

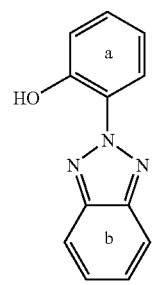

(I)

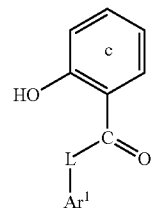

(II)

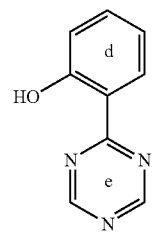

(III)

9 Claims, 1 Drawing Sheet

U.S. PATENT DOCUMENTS 6,307,671 B1    10/2001   Yabuki
6,515,811 B1     2/2003   Ikuhara et al.
6,586,057 B1     7/2003   Yabuki
6,680,009 B1 *   1/2004   Harada et al. .............. 252/587

* cited by examiner

OPTICAL FILTER HAVING FILTER LAYER CONTAINING INFRARED ABSORBING DYE AND ULTRAVIOLET ABSORBING AGENT

CROSS-REFERENCE TO RELATED APPLICATION

This application is a divisional of application Ser. No. 09/978,029, filed Oct. 17, 2001, now U.S. Pat. No. 6,875,512 the contents of which are incorporated herein by reference.

FIELD OF THE INVENTION

The present invention relates to an optical filter comprising a transparent support and a filter layer. In detail, the invention relates to an optical filter used in a display device such as a plasma display panel (PDP), a liquid crystal display device (LCD), an electroluminescence display (ELD), a fluorescent indicator tube or a field emission display to improve the color reproducibility and to prevent the device from causing faulty working of remote-controlled apparatus.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (practically impossible) to use the ideal three primary colors. For example, the plasma display panel uses phosphors of the three primary colors, which emit light containing an unnecessary component (in the wavelength region of 560 to 620 nm). Therefore, it has been proposed to correct the color balance of the displayed image by an optical filter absorbing the unnecessary component. The optical filter for the color correction is described in Japanese Patent Provisional Publication Nos. 58(1983)-153904, 61(1986)-188501, 3(1991)-231988, 5(1993)-205643, 9(1997)-145918, 9(1997)-306366 and 10(1998)-26704.

Further, it has been reported that infrared rays (mainly in the wavelength region of 750 to 1,100 nm) emitted from the display device may cause faulty working of remote-controlled apparatus. For solving this problem, an infrared rays-absorbing filter is used. Dyes used in the infrared rays-absorbing filter are described in U.S. Pat. No. 5,945,209.

SUMMARY OF THE INVENTION

An object of the present invention is to provide an optical filter which selectively removes infrared rays and light lowering the color purity of displayed images and thereby which prevents faulty working of remote-controlled apparatuses and improves both color balance of the images and durability.

Another object of the invention is to provide a display device equipped with the above optical filter.

The present invention provides an optical filter which comprises a transparent support and a filter layer containing a dye and a binder polymer, wherein the dye is in an aggregated form exhibiting an absorption maximum in the wavelength region of 750 to 1,100 nm, and wherein the support, the filter layer or an optional layer contains a ultraviolet absorbing agent represented by the formula (I), (II), (III), (IV), (V), (VI), (VII) or (VIII):

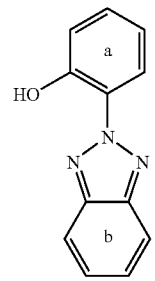
(I)

in which the benzene rings a and b may have a substituent group;

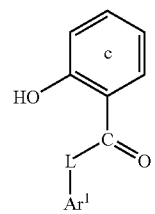
(II)

in which $Ar^1$ is an aryl group or an aromatic heterocyclic group, —L— is a single bond or —O—, and the benzene ring c may have a substituent group;

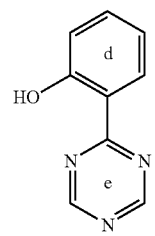
(III)

in which the benzene ring d and the triazine ring e may have a substituent group, and the benzene ring d may be condensed with another aromatic ring or a heterocyclic ring;

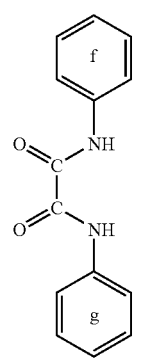
(IV)

in which the benzene rings f and g may have a substituent group;

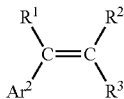

(V)

in which $Ar^2$ is an aryl group or an aromatic heterocyclic group; $R^1$ is hydrogen or an alkyl group; and each of $R^2$ and $R^3$ independently is cyano, —$COR^{13}$, —$COOR^{14}$, —$CONR^{15}R^{16}$, —$SO_2R^{17}$ or —$SO_2NR^{18}R^{19}$, wherein each of $R^{13}$, $R^{14}$, $R^{15}$, $R^{16}$, $R^{17}$, $R^{18}$ and $R^{19}$ independently is hydrogen, an alkyl group, a substituted alkyl group or an aryl group, or $R^2$ and $R^3$ are combined to form a five-membered or six-membered ring;

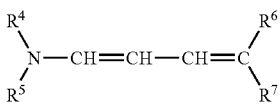

(VI)

in which each of $R^4$ and $R^5$ independently is hydrogen, an alkyl group or an aryl group, or $R^4$ and $R^5$ are combined to form a five-membered or six-membered ring; and each of $R^6$ and $R^7$ independently is cyano, —$COR^{20}$, —$COOR^{21}$, —$CONR^{22}R^{23}$, —$SO_2R^{24}$ or —$SO_2NR^{25}R^{26}$, wherein each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group, or $R^6$ and $R^7$ are combined to form a five-membered or six-membered ring;

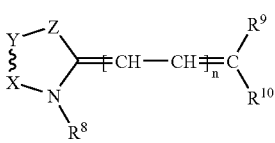

(VII)

in which $R^8$ is an alkyl group, a substituted alkyl group or an aryl group; each of $R^9$ and $R^{10}$ independently is cyano, —$COR^{27}$, —$COOR^{28}$, —$CONR^{29}R^{30}$, —$SO_2R^{31}$ or —$SO_2NR^{32}R^{33}$, wherein each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group, or $R^9$ and $R^{10}$ are combined to form a five-membered or six-membered ring; —X~Y— is —$CR^{34}R^{35}$—$CR^{36}R^{37}$— or —$CR^{38}$═$CR^{39}$—, wherein each of $R^{34}$, $R^{35}$, $R^{36}$, $R^{37}$, $R^{38}$ and $R^{39}$ independently is hydrogen, an alkyl group or an aryl group, or $R^{38}$ and $R^{39}$ are combined to form a benzene or naphthalene ring; —Z— is —O—, —S—, —$NR^{40}$—, —$CR^{41}R^{42}$— or —CH═CH—, wherein $R^{40}$ is an alkyl group, a substituted alkyl group or an aryl group, and each of $R^{41}$ and $R^{42}$ independently is hydrogen or an alkyl group; n is 0 or 1;

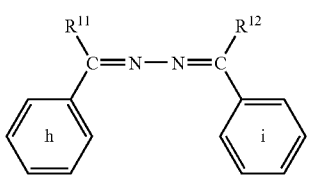

(VIII)

in which each of $R^{11}$ and $R^{12}$ independently is hydrogen, an alkyl group or an aryl group, or $R^{11}$ and $R^{12}$ are combined to form a five-membered or six-membered ring; the benzene rings h and i may have a substituent group; and the benzene rings h and i may be condensed with another aromatic ring or a heterocyclic ring.

The invention also provides a plasma display panel having a display surface covered with an optical filter, wherein the optical filter comprises a transparent support and a filter layer, said optical layer having an absorption maximum in each wavelength region of 300 to 390 nm, 560 to 620 nm, 750 to 850 nm, 851 to 950 nm and 951 to 1,100 nm.

The optical filter of the invention removes both infrared rays and light lowering color purity, and further has improved light resistance. The optical filter prevents a plasma display panel from causing faulty working of remote-controlled apparatus, and improves color balance of displayed images.

DETAILED DESCRIPTION OF THE INVENTION

[Plasma Display Panel]

Figure 1:
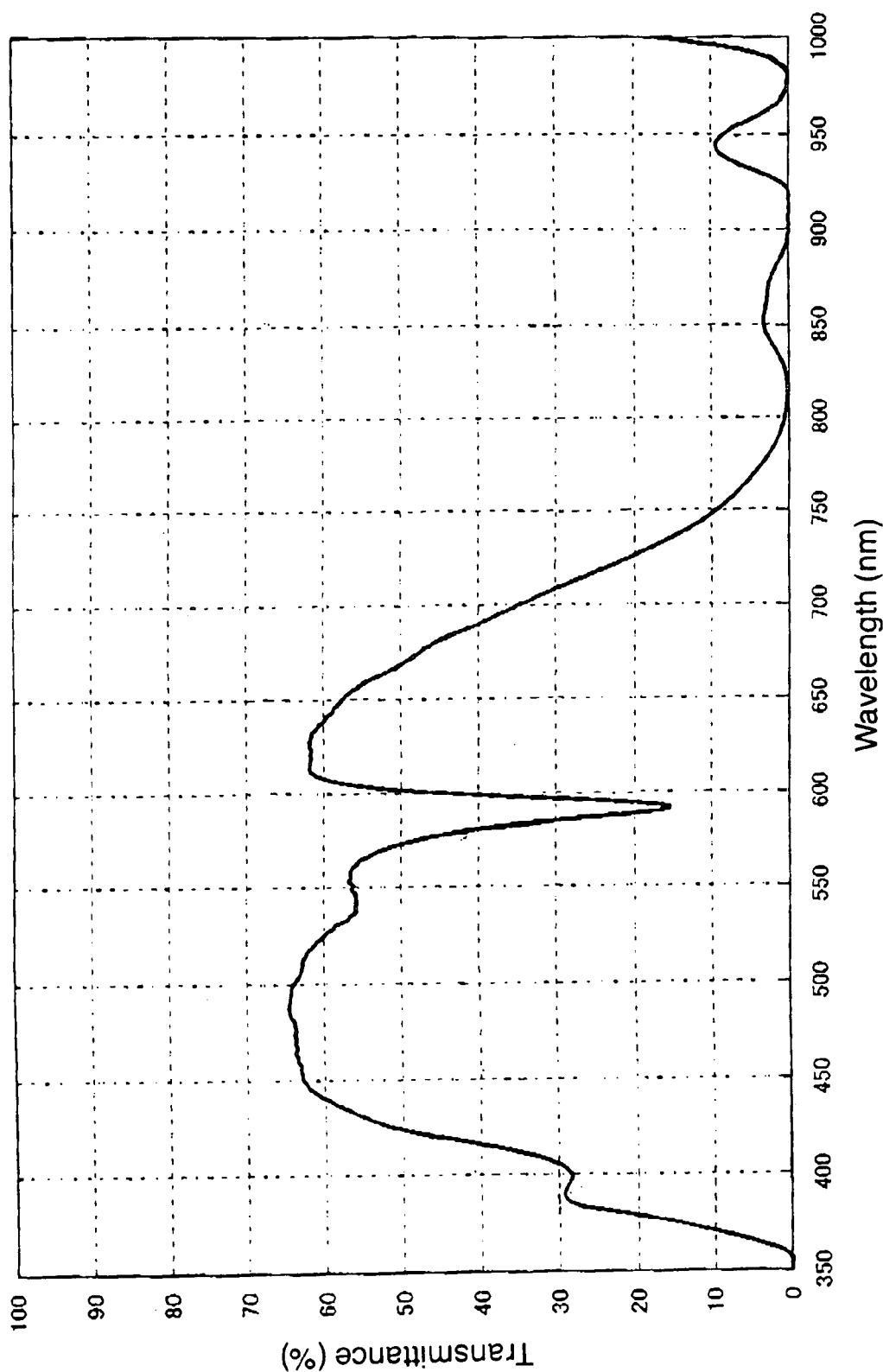
FIG. 1 is a graph showing absorption spectrum of an optical filter prepared in Example 18.

A plasma display panel (PDP) generally comprises gas, glass substrates (front and back glass substrates), electrodes, electrode-lead member, thick film printing member, and phosphor. Each glass substrate is equipped with the electrode and an insulating layer. On the back glass substrate, a phosphor layer is further provided. The gas is enclosed between the substrates.

In front of the plasma display panel, a front plate may be provided. The front plate preferably is strong enough to protect the plasma display panel. The front plate may be directly laminated on the plasma display panel or there may be a space between the front plate and the plasma display panel.

The plasma display device means the whole device comprising at least the plasma display panel and a body. The front plate is also included in the device.

A plasma display panel (PDP) is commercially available, and is described in Japanese Patent Provisional Publication Nos. 5(1993)-205643 and 9(1997)-306366.

[Ultraviolet Absorbing Agent]

The ultraviolet absorbing agent preferably is a compound of not disturbing color correcting function of the aggregated dye, not absorbing image-displaying light emitted from the phosphors, and not coloring the image display device when the image is not displayed.

The ultraviolet absorbing agent preferably has the absorption maximum of the longest wavelength within the wavelength region of 300 to 390 nm. The absorption maximum of the longest wavelength is more preferably in the range of 310 to 380 nm, and most preferably in the range of 320 to 360 nm.

The absorption at the wavelength of 50 nm longer than the absorption maximum is preferably less than 10%, more preferably less than 7%, and most preferably less than 5% of the absorption at the absorption maximum.

An absorption spectrum of an ultraviolet absorbing agent is measured in a solution, since it is difficult to measure the spectrum in an optical filter because other components such as dispersed particles disturb the spectrum. Accordingly, an ultraviolet absorbing agent in a solution preferably satisfies the above-described absorption. The solvent of the solution is water (in the case of a water-soluble ultraviolet absorbing agent) or ethyl acetate (in the case of an oil-soluble ultraviolet absorbing agent).

Further, the ultraviolet absorbing agent is preferably stable to ultraviolet rays.

The present invention uses a compound represented by the formula (I), (II), (III), (IV), (V), (VI), (VII) or (VIII).

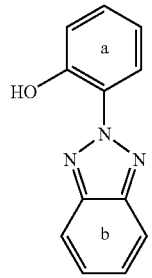
(I)

In the formula (I), the benzene rings a and b may have a substituent group.

Examples of the substituent group include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the present specification, an alkyl group preferably has 1 to 20 carbon atoms. An alkyl group of a chain structure is preferred to a cyclic alkyl group. The alkyl group can have a branched chain. Examples of the alkyl group include methyl, ethyl, isopropyl, butyl, sec-butyl, tert-butyl, pentyl, tert-pentyl, hexyl, octyl, 2-ethylhexyl, tert-octyl, decyl, dodecyl, hexadecyl, octadecyl, cyclopropyl, cyclopentyl, cyclohexyl and bicyclo[2,2,2]octyl.

In the present specification, an alkyl moiety of a substituted alkyl group is the same as the above-described alkyl group. Examples of the substituent groups of the substituted alkyl groups include an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the present specification, an alkenyl group preferably has 2 to 20 carbon atoms. An alkenyl group of a chain structure is preferred to a cyclic alkenyl group. The alkenyl group can have a branched chain. Examples of the alkenyl group include allyl, 2-butenyl and oleyl.

In the present specification, an alkenyl moiety of a substituted alkenyl group is the same as the above-described alkenyl group. Examples of the substituent groups of the substituted alkenyl groups include an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the present specification, an aryl group preferably has 6 to 10 carbon atoms. Examples of the aryl groups include phenyl and naphthyl.

The aryl group can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the present specification, a heterocyclic group preferably has a five-membered or six-membered heterocyclic ring. Examples of the heterocyclic groups include furan ring, thiophene ring, indole ring, pyrrole ring, pyrazole ring, imidazole ring and pyridine ring.

The heterocyclic group can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

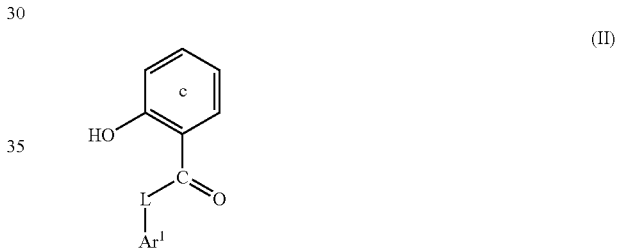
(II)

In the formula (II), Ar$^1$ is an aryl group or an aromatic heterocyclic group. Ar$^1$ preferably is an aryl group.

The aromatic heterocyclic group preferably has a five-membered or six-membered heterocyclic ring. Examples of the aromatic heterocyclic groups include furan ring, thiophene ring, indole ring, pyrrole ring, pyrazole ring, imidazole ring and pyridine ring.

The aromatic heterocyclic group can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the formula (II), —L— is a single bond or —O—, and preferably is a single bond.

In the formula (II), the benzene ring c may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

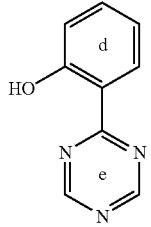

(III)

In the formula (III), the benzene ring d and the triazine ring e may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

The substituent group of the triazine ring e preferably is an aryl group, more preferably is phenyl, and most preferably is o-hydroxyphenyl.

In the formula (III), the benzene ring d may be condensed with another aromatic ring or a heterocyclic ring. Examples of the aromatic rings include benzene ring and naphthalene ring. Examples of the heterocyclic rings include furan ring, thiophene ring, indole ring, pyrrole ring, pyrazole ring, imidazole ring and pyridine ring.

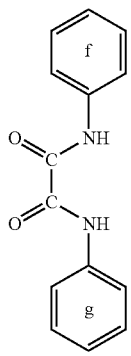

(IV)

In the formula (IV), the benzene rings f and g may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

(V)

In the formula (V), Ar$^2$ is an aryl group or an aromatic heterocyclic group.

The aromatic heterocyclic group preferably has a five-membered or six-membered heterocyclic ring. Examples of the aromatic heterocyclic groups include furan ring, thiophene ring, indole ring, pyrrole ring, pyrazole ring, imidazole ring and pyridine ring.

The aromatic heterocyclic group can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the formula (V), R$^1$ is hydrogen or an alkyl group.

In the formula (V), each of R$^2$ and R$^3$ independently is cyano, —COR$^{13}$, —COOR$^{14}$, —CONR$^{15}$R$^{16}$, —SO$_2$R$^{17}$ or —SO$_2$NR$^{18}$R$^{19}$. Here each of R$^{13}$, R$^{14}$, R$^{15}$, R$^{16}$, R$^{17}$, R$^{18}$ and R$^{19}$ independently is hydrogen, an alkyl group, a substituted alkyl group or an aryl group. Otherwise, R$^2$ and R$^3$ may be combined to form a five-membered or six-membered ring.

At least one of R$^{15}$ and R$^{16}$ preferably is hydrogen. At least one of R$^{18}$ and R$^{19}$ preferably is hydrogen.

The five-membered or six-membered ring formed by combined R$^2$ and R$^3$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantonin ring, 2-thiohydantonin ring, 4-thiohydantonin ring, 2,4-oxazolidinedione, isooxazolone ring, barbituric acid ring, thiobarbituric acid ring, indanedione ring, hydroxypyridone ring, furanone ring, 1,3-cyclohexanedione ring and meldramic acid ring.

The five-membered or six-membered ring can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

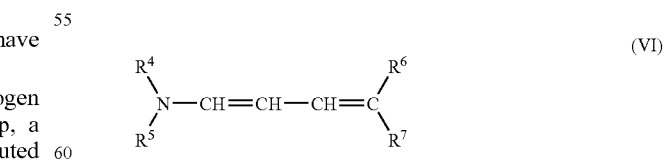

(VI)

In the formula (VI), each of R$^4$ and R$^5$ independently is hydrogen, an alkyl group or an aryl group, or R$^4$ and R$^5$ are combined to form a five-membered or six-membered ring.

Examples of the five-membered or six-membered rings include pyrrolidine ring, piperidine ring and morpholine ring.

The five-membered or six-membered ring can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the formula (VI), each of $R^6$ and $R^7$ independently is cyano, —COR$^{20}$, —COOR$^{21}$, —CONR$^{22}$R$^{23}$, —SO$_2$R$^{24}$ or —SO$_2$NR$^{25}$R$^{26}$. Each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group. $R^6$ and $R^7$ can be combined to form a five-membered or six-membered ring At least one of $R^{22}$ and $R^{23}$ preferably is hydrogen. At least one of $R^{25}$ and $R^{26}$ preferably is hydrogen.

The five-membered or six-membered ring formed by combined $R^6$ and $R^7$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantonin ring, 2-thiohydantonin ring, 4-thiohydantonin ring, 2,4-oxazolidinedione, isooxazolone ring, barbituric acid ring, thiobarbituric acid ring, indanedione ring, hydroxypyridone ring, furanone ring, 1,3-cyclohexanedione ring and meldramic acid ring.

The five-membered or six-membered ring can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

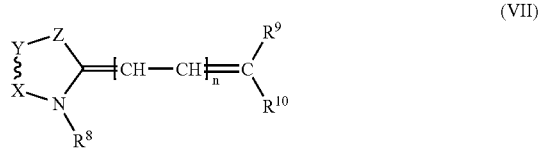

(VII)

In the formula (VII), $R^8$ is an alkyl group, a substituted alkyl group or an aryl group.

In the formula (VII), each of $R^9$ and $R^{10}$ independently is cyano, —COR$^{27}$, —COOR$^{28}$, —CONR$^{29}$R$^{30}$, —SO$_2$R$^{31}$ or —SO$_2$NR$^{32}$R$^{33}$. Each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group. $R^9$ and $R^{10}$ can be combined to form a five-membered or six-membered ring.

At least one of $R^{29}$ and $R^{30}$ preferably is hydrogen. At least one of $R^{32}$ and $R^{33}$ preferably is hydrogen.

The five-membered or six-membered ring formed by combined $R^9$ and $R^{10}$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantonin ring, 2-thiohydantonin ring, 4-thiohydantonin ring, 2,4-oxazolidinedione, isooxazolone ring, barbituric acid ring, thiobarbituric acid ring, indanedione ring, hydroxypyridone ring, furanone ring, 1,3-cyclohexanedione ring and meldramic acid ring.

The five-membered or six-membered ring can have a substituent group. Examples of the substituent groups include an alkyl group, a substituted alkyl group, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the formula (VII), —X~Y— is —CR$^{34}$R$^{35}$—CR$^{36}$R$^{37}$— or —CR$^{38}$=CR$^{39}$—. Each of $R^{34}$, $R^{35}$, $R^{36}$, $R^{37}$, $R^{38}$ and $R^{39}$ independently is hydrogen, an alkyl group or an aryl group. $R^{38}$ and $R^{39}$ can be combined to form a benzene or naphthalene ring.

In the formula (VII), —Z— is —O—, —S—, —NR$^{40}$—, —CR$^{41}$R$^{42}$— or —CH=CH—. $R^{40}$ is an alkyl group, a substituted alkyl group or an aryl group. Each of $R^{41}$ and $R^{42}$ independently is hydrogen or an alkyl group.

In the formula (VII), n is 0 or 1.

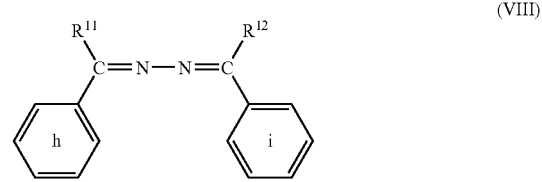

(VIII)

In the formula (VIII), each of $R^{11}$ and $R^{12}$ independently is hydrogen, an alkyl group or an aryl group. $R^{11}$ and $R^{12}$ can be combined to form a five-membered or six-membered ring.

In the formula (VIII), the benzene rings h and i may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. Here, R is hydrogen, an alkyl group, a substituted alkyl group, an alkenyl group, a substituted alkenyl group or an aryl group.

In the formula (VIII), the benzene rings h and i may be condensed with another aromatic ring or a heterocyclic ring. Examples of the aromatic rings include benzene ring and naphthalene ring. Examples of the heterocyclic groups include furan ring, thiophene ring, indole ring, pyrrole ring, pyrazole ring, imidazole ring and pyridine ring.

The ultraviolet absorbing agent preferably is a compound represented by the formula (I), (II), (III) or (IV), more preferably is a compound represented by the formula (I), (II) or (III), and most preferably is a compound represented by the formula (I) or (III).

Examples of the compounds represented by the formula (I), (II), (III), (IV), (V), (VI), (VII) or (VIII) are shown below.

(I-1)–(I-13)

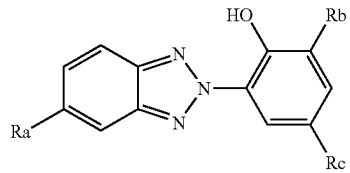

| | | | | | | |
|---|---|---|---|---|---|---|
| (I-1) | Ra: | —H, | Rb: | —H, | Rc: | -t-C$_8$H$_{17}$ |
| (I-2) | Ra: | —H, | Rb: | -t-C$_4$H$_9$, | | |
| | Rc: | —CH$_2$CH$_2$COOC$_8$H$_{17}$ | | | | |
| (I-3) | Ra: | —H, | Rb: | —C(CH$_3$)$_2$—Ph, | Rc: | -t-C$_8$H$_{17}$ |
| (I-4) | Ra: | —H, | Rb: | —C(CH$_3$)$_2$—Ph, | | |
| | Rc: | —C(CH$_3$)$_2$—Ph | | | | |
| (I-5) | Ra: | —H, | Rb: | —H, | Rc: | —CH$_3$ |
| (I-6) | Ra: | —H, | Rb: | -t-C$_5$H$_{11}$, | Rc: | -t-C$_5$H$_{11}$ |
| (I-7) | Ra: | —H, | Rb: | -t-C$_5$H$_{11}$, | Rc: | —H |
| (I-8) | Ra: | —H, | Rb: | —NHCOCH(CH$_3$)$_2$, | Rc: | —CH$_3$ |
| (I-9) | Ra: | —Cl, | Rb: | -t-C$_4$H$_9$, | Rc: | -t-C$_4$H$_9$ |
| (I-10) | Ra: | —OCH$_3$, | Rb: | -t-C$_4$H$_9$, | Rc: | —CH$_3$ |
| (I-11) | Ra: | —Cl, | Rb: | -t-C$_4$H$_9$, | | |
| | Rc: | —CH$_2$CH$_2$COOC$_8$H$_{17}$ | | | | |
| (I-12) | Ra: | —H, | Rb: | —C$_{12}$H$_{25}$, | Rc: | —CH$_3$ |
| (I-13) | Ra: | —SC$_{12}$H$_{25}$, | Rb: | -t-C$_4$H$_9$, | Rc: | -t-C$_4$H$_9$ |
| (Remark) | Ph: | Phenyl | | | | |

(I-14)

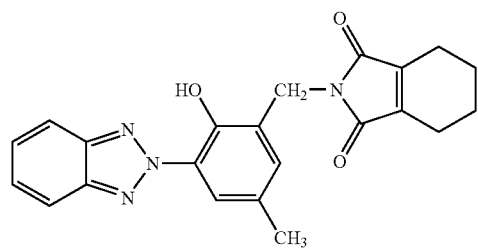

(I-15)

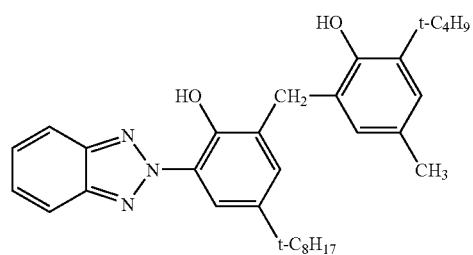

(I-16)

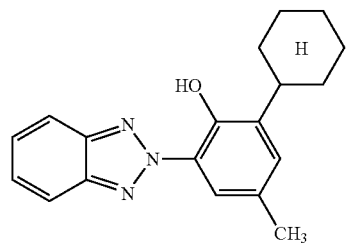

(I-17)

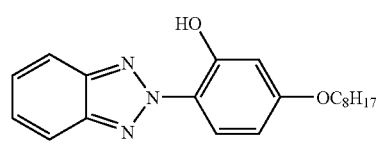

-continued
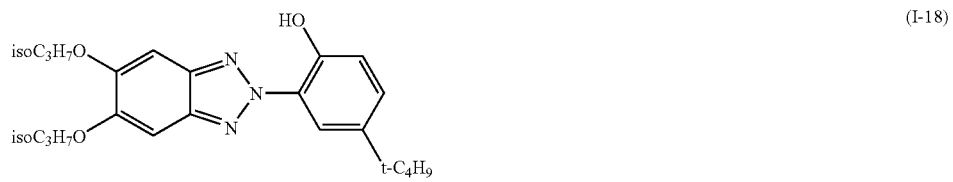
(I-18)
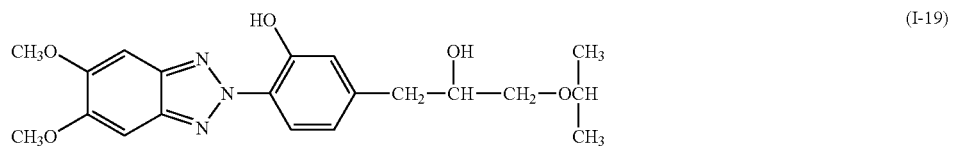
(I-19)
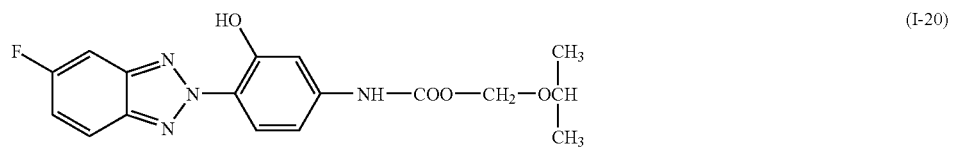
(I-20)
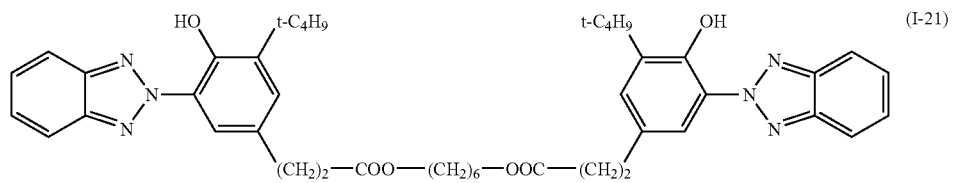
(I-21)
(II-1)–(II-8)
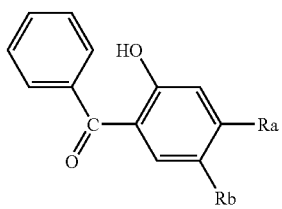
| (II-1) | Ra: | —OCH$_3$, | Rb: | —H |
| (II-2) | Ra: | —OC$_8$H$_{17}$, | Rb: | —H |
| (II-3) | Ra: | —OCH$_2$—Ph, | Rb: | —H |
| (II-4) | Ra: | —OCH$_2$—COO—C$_2$H$_5$, | Rb: | —H |
| (II-5) | Ra: | —OH, | Rb: | —CO—Ph |
| (II-6) | Ra: | —O—(CH$_2$)$_3$—COOH, | Rb: | —H |
| (II-7) | Ra: | —OH, | Rb: | —H |
| (II-8) | Ra: | —OCH$_3$, | Rb: | —SO$_3$H |
| (Remark) | Ph: | Phenyl | | |
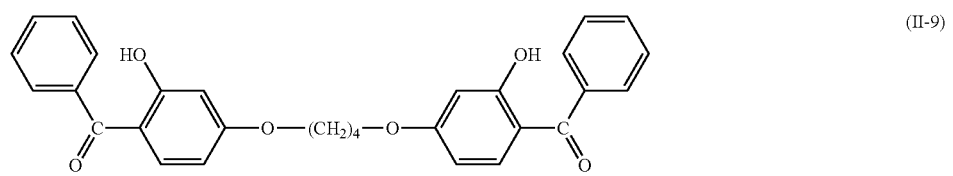
(II-9)
(II-10)

-continued
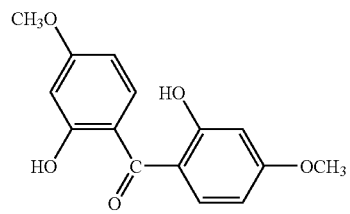 (II-11)
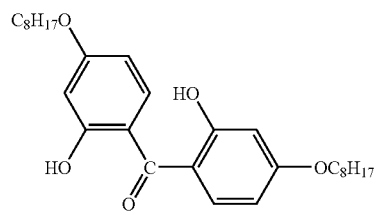 (II-12)
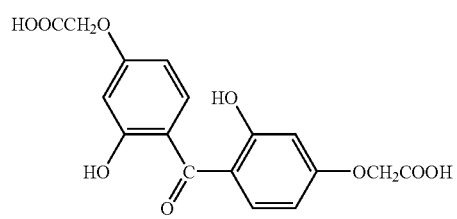 (II-13)
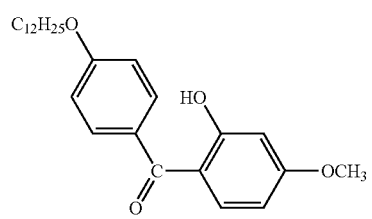 (II-14)
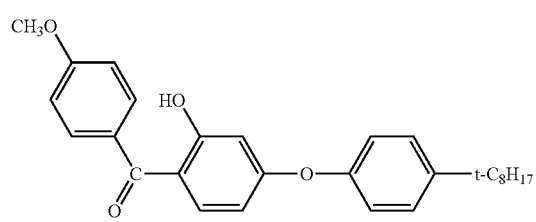 (II-15)
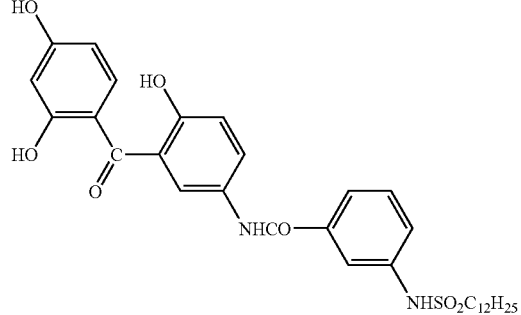 (II-16)
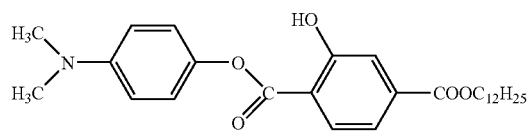 (II-17)

-continued
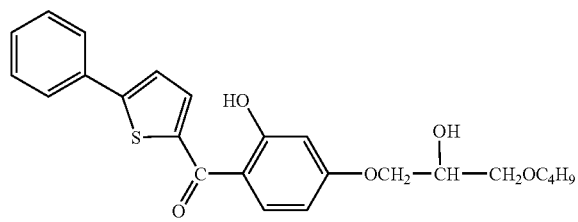
(II-18)
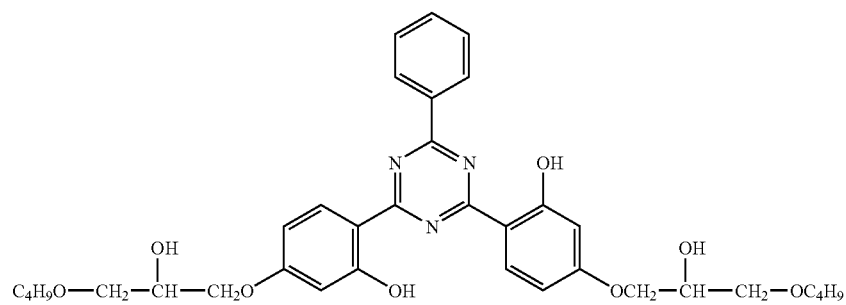
(III-1)
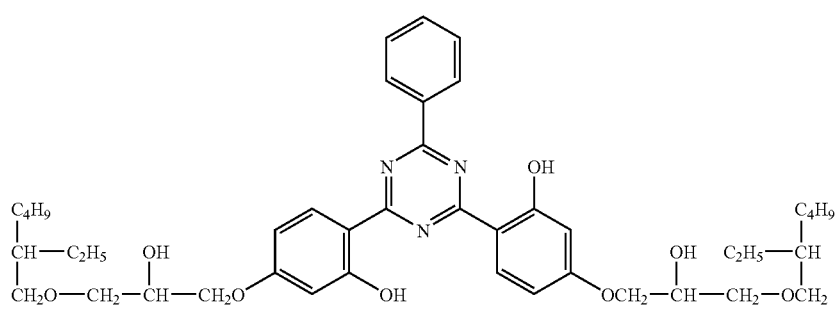
(III-2)
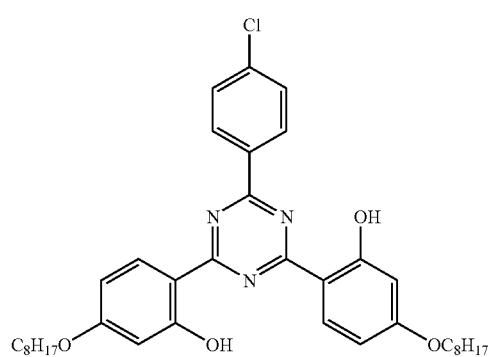
(III-3)
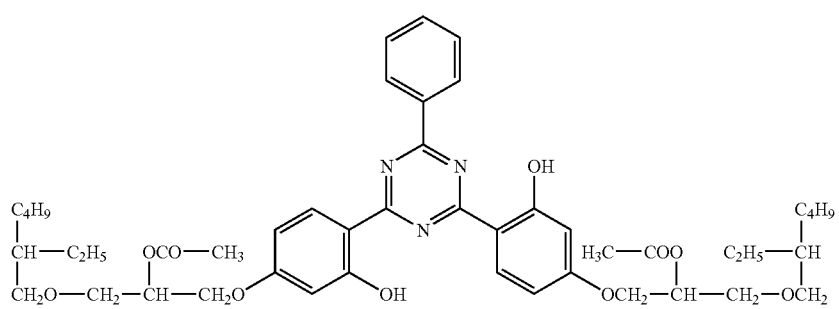
(III-4)

-continued
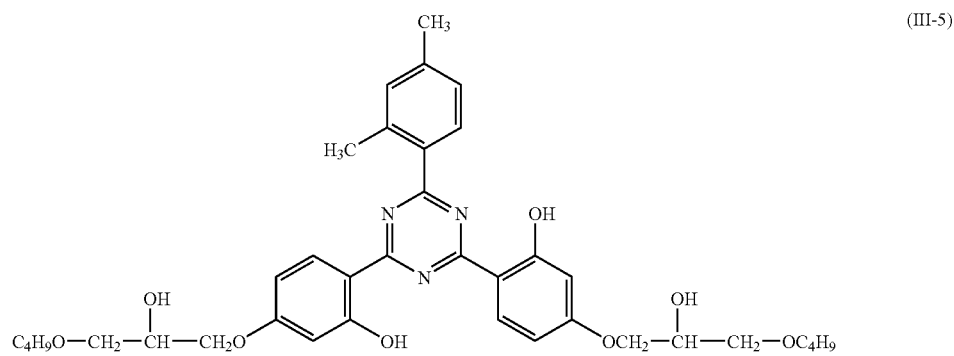
(III-5)
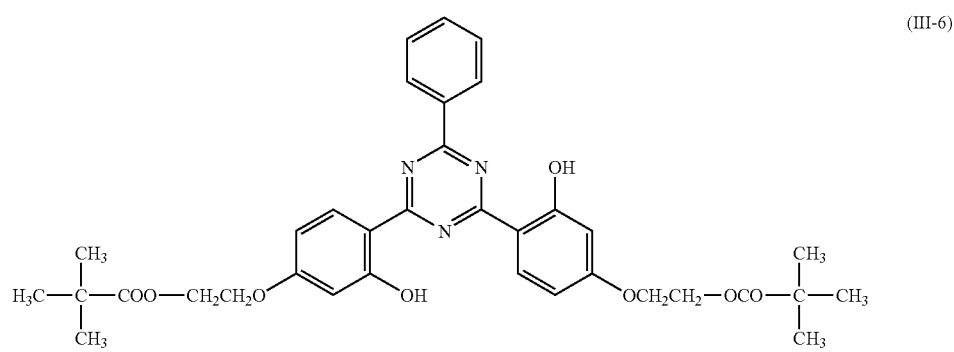
(III-6)
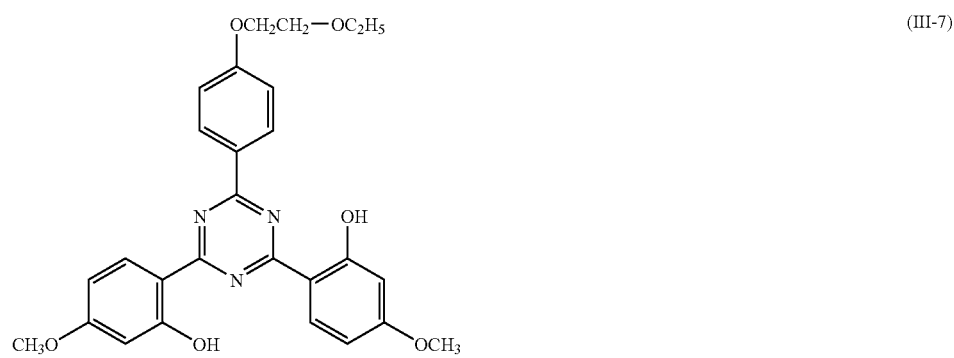
(III-7)
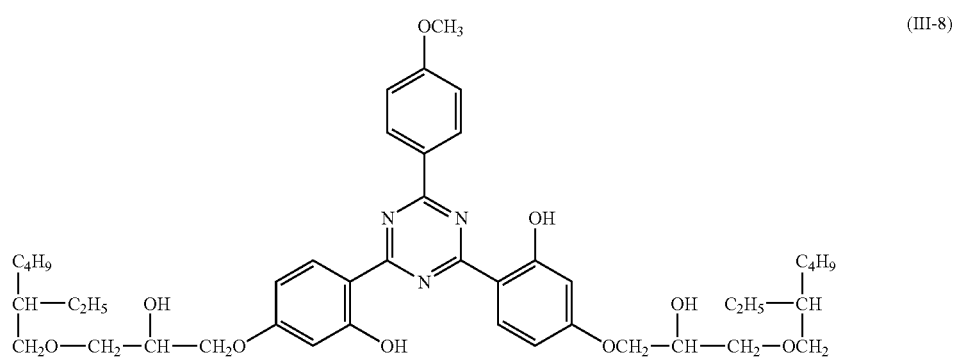
(III-8)

-continued
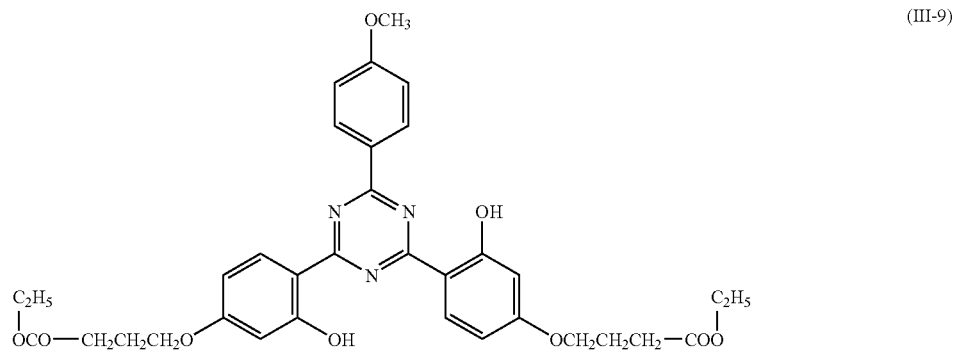 (III-9)
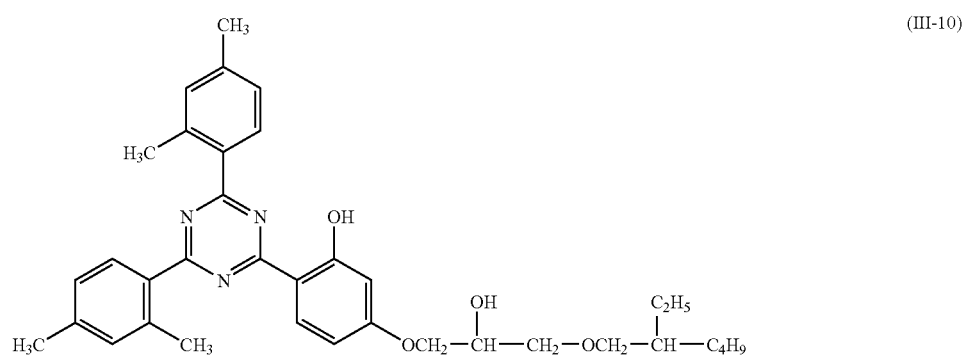 (III-10)
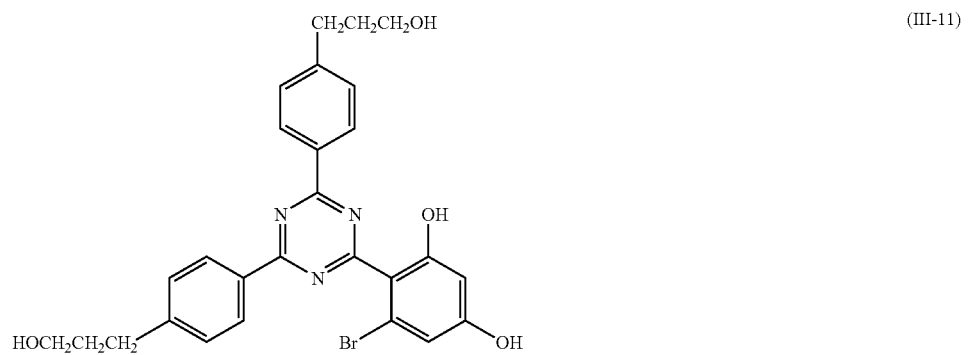 (III-11)
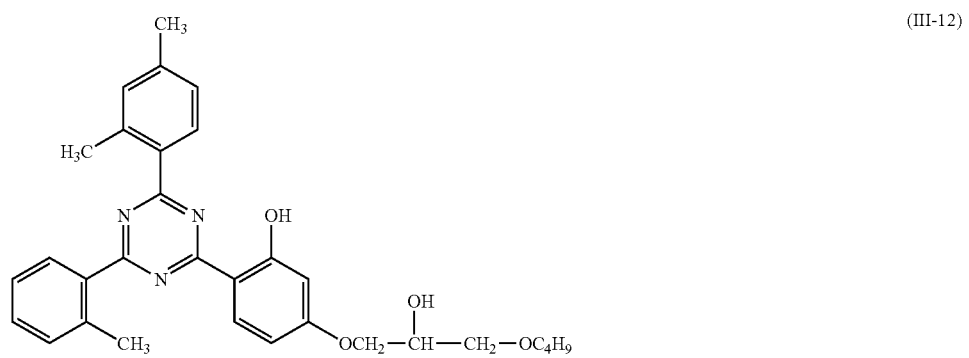 (III-12)

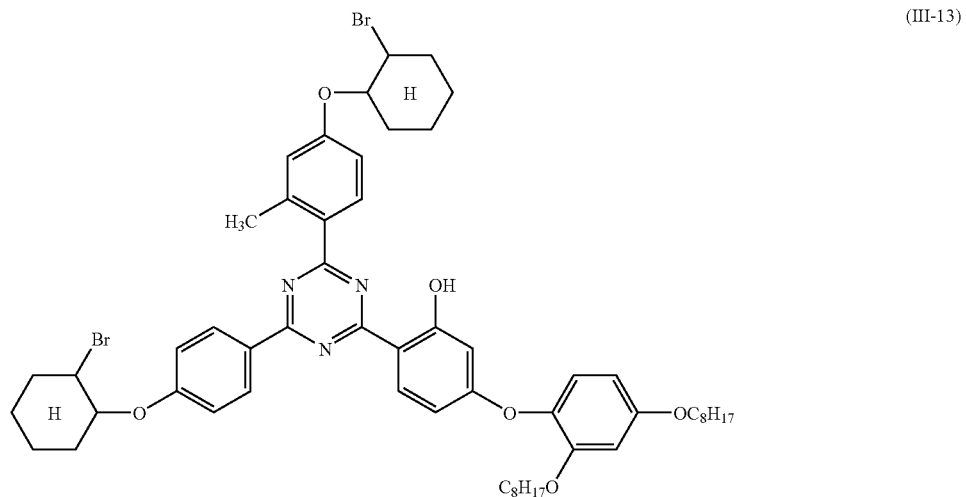
(III-13)
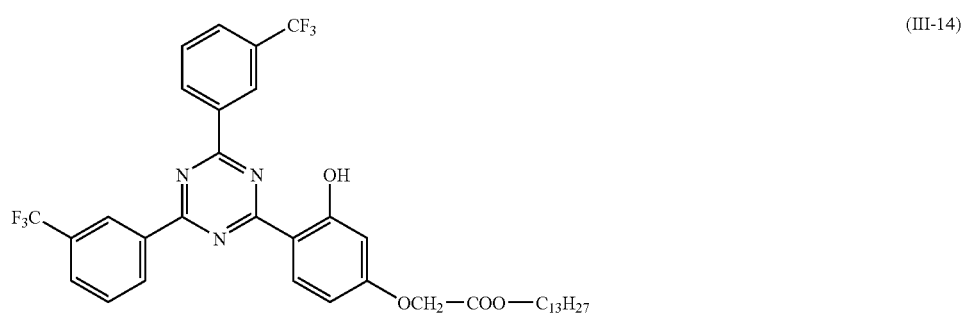
(III-14)
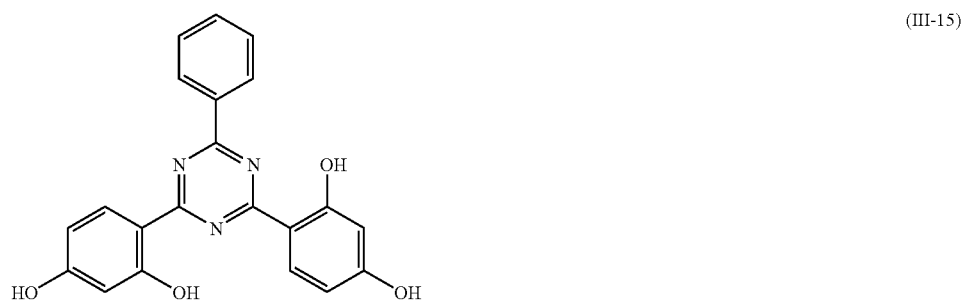
(III-15)
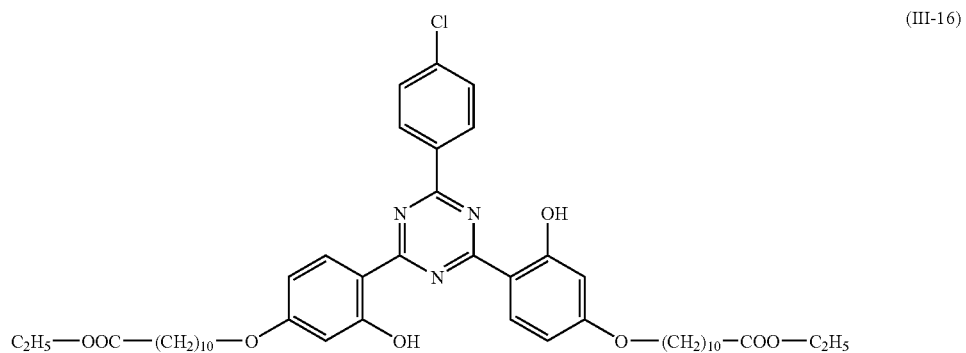
(III-16)

-continued
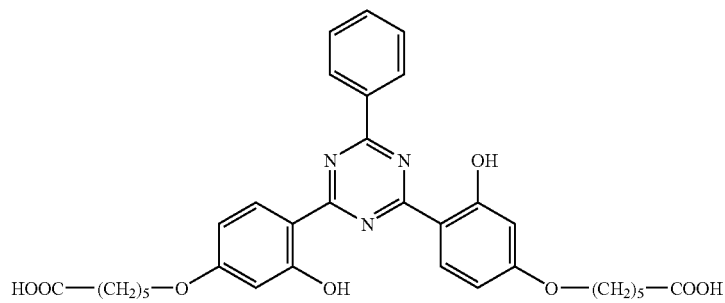
(III-17)
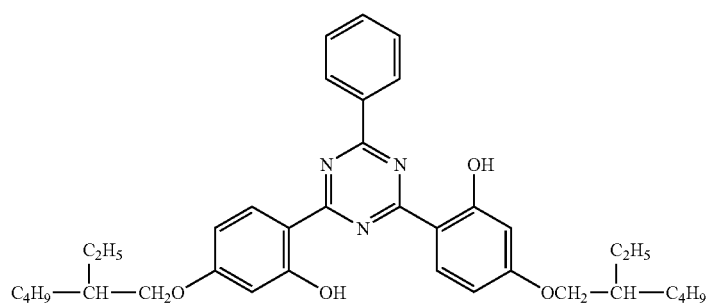
(III-18)
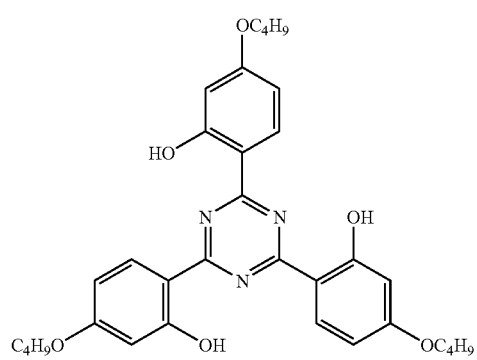
(III-19)
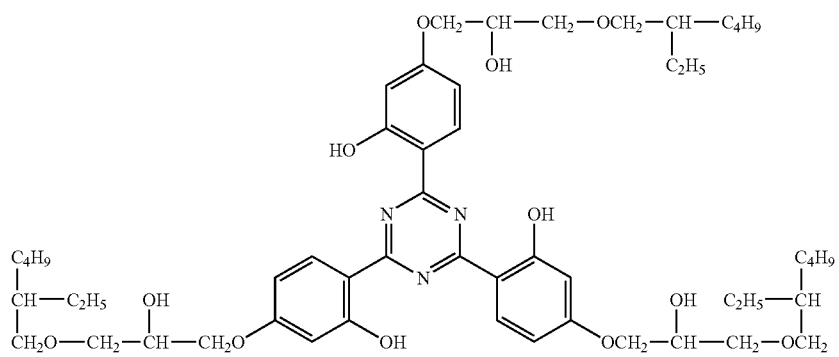
(III-20)

-continued
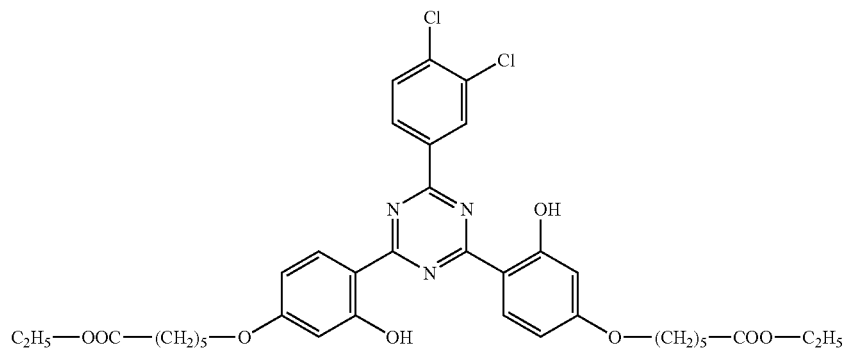
(III-21)
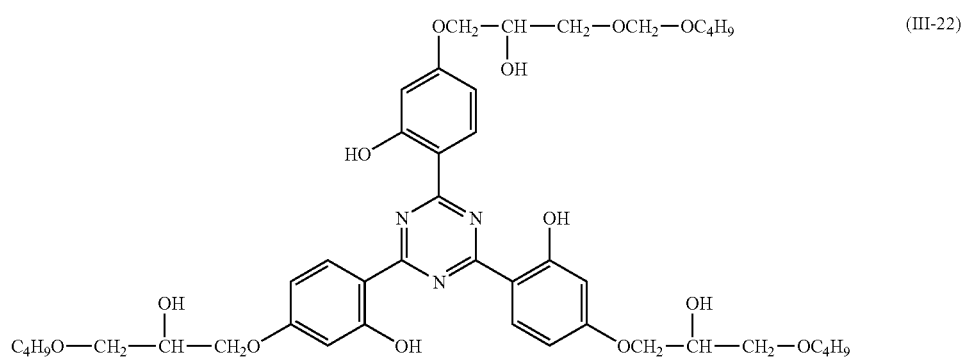
(III-22)
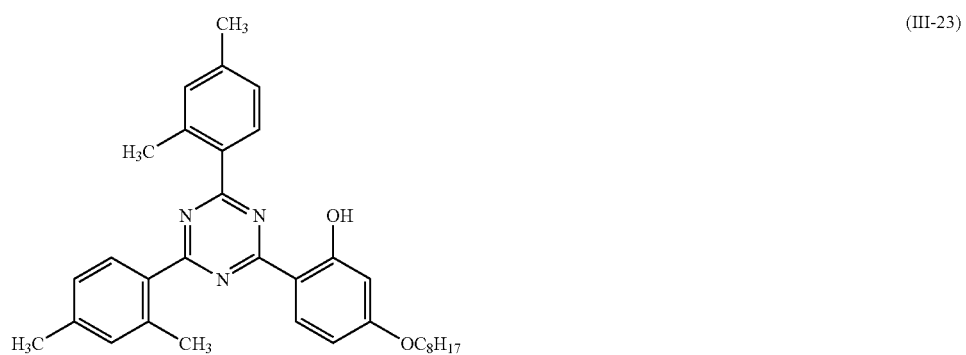
(III-23)
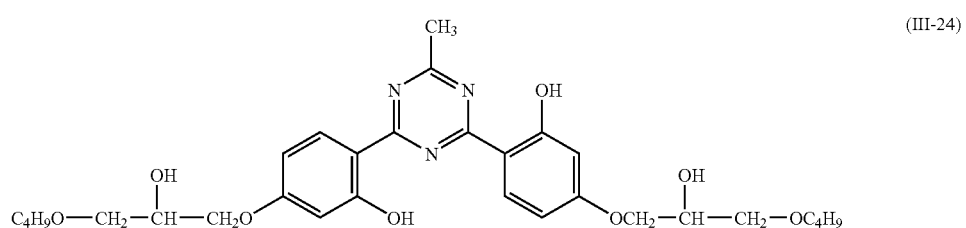
(III-24)

-continued
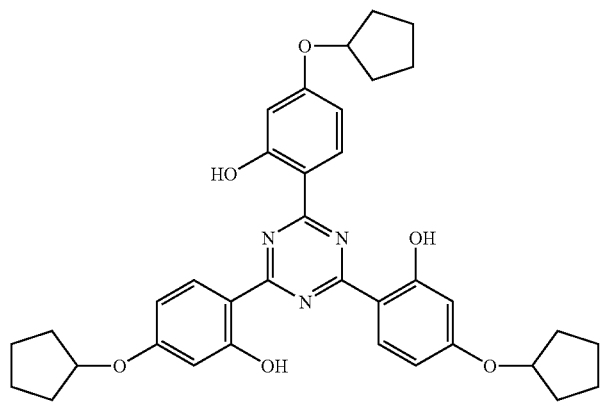
(III-25)
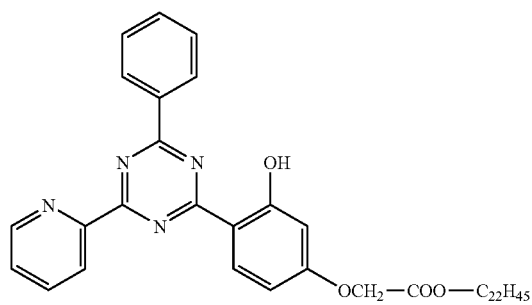
(III-26)
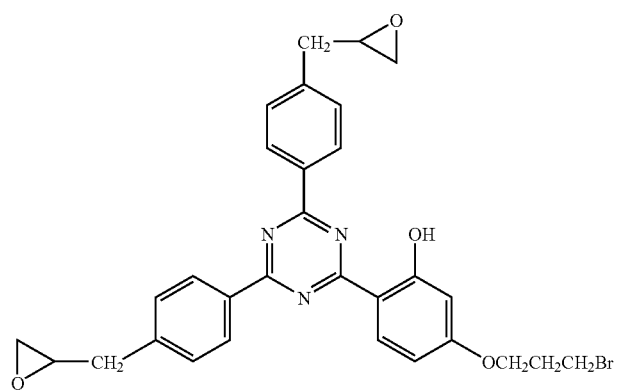
(III-27)
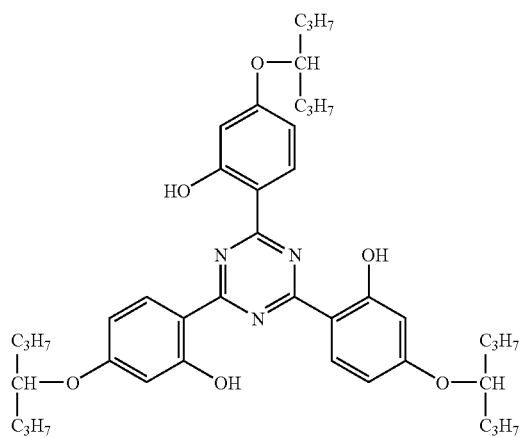
(III-28)

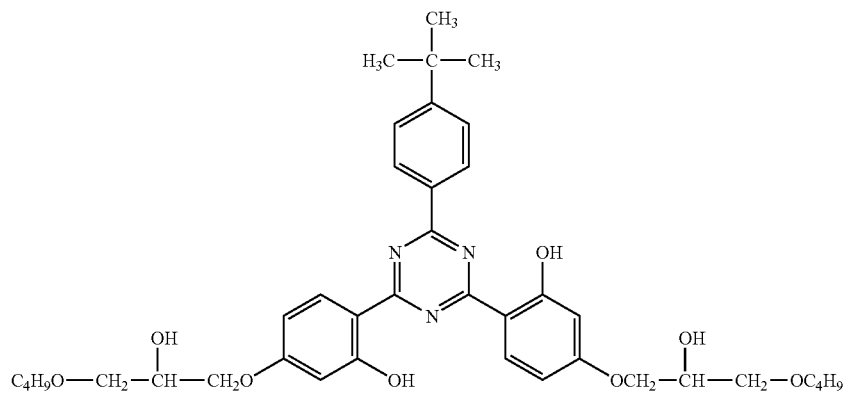
(III-29)
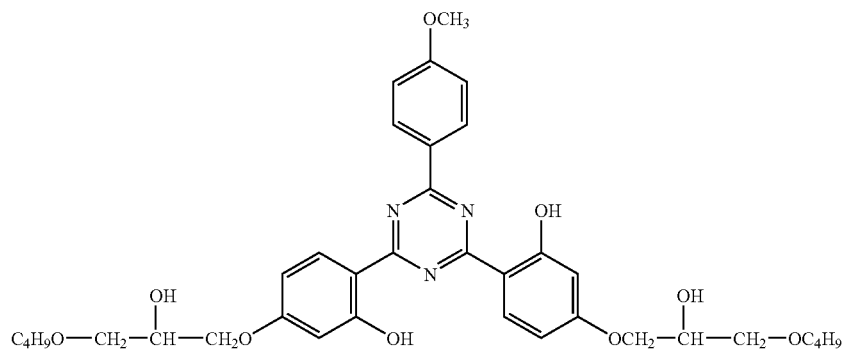
(III-30)
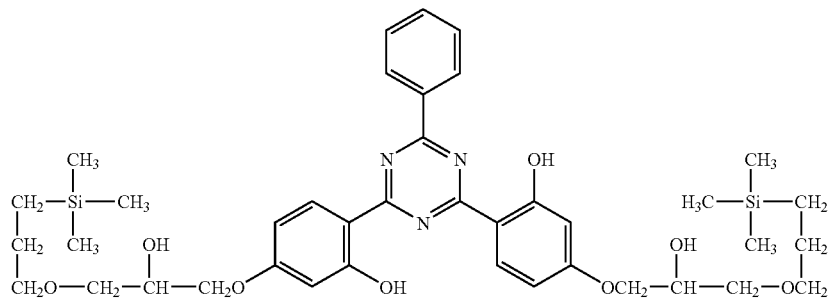
(III-31)
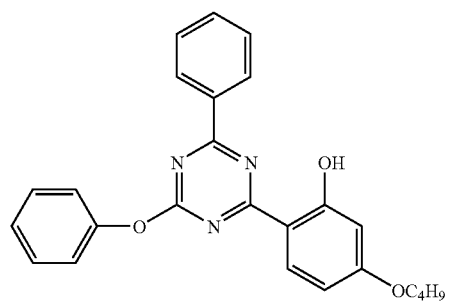
(III-32)

-continued
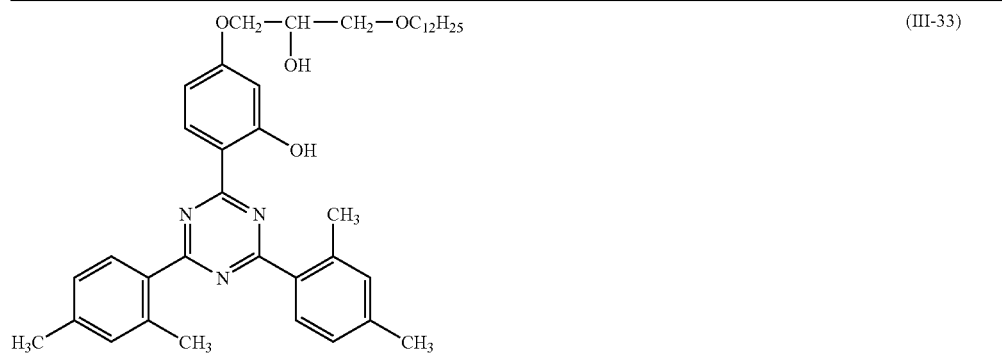
(III-33)
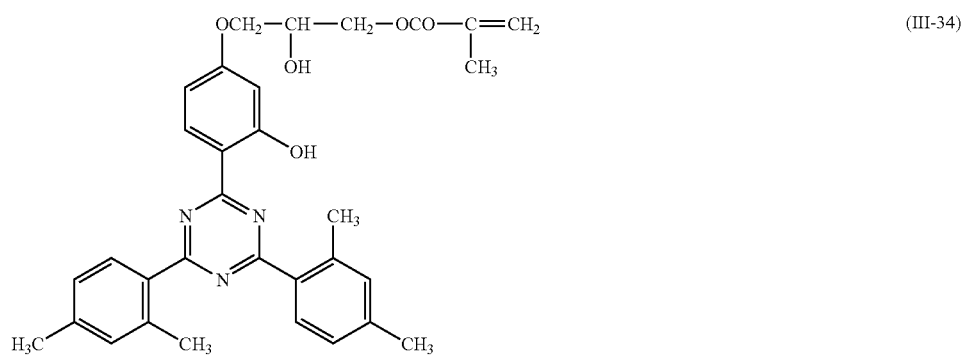
(III-34)
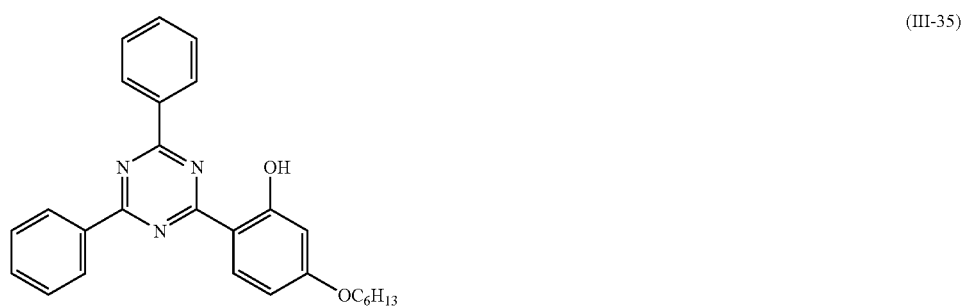
(III-35)
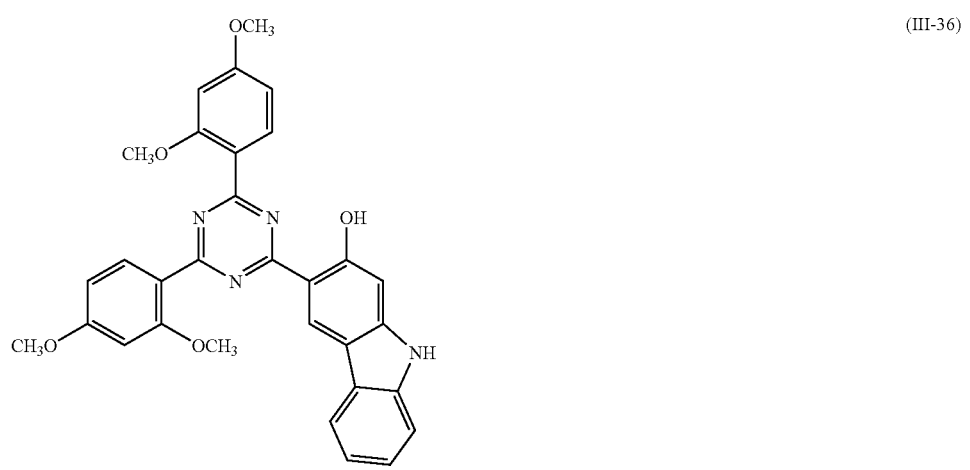
(III-36)

-continued
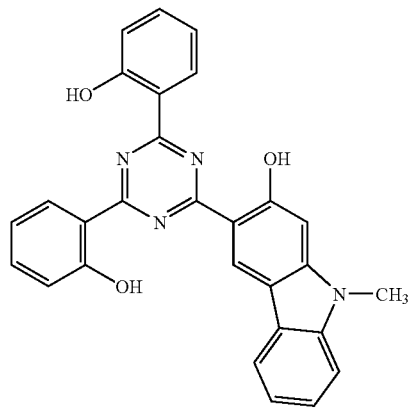
(III-37)
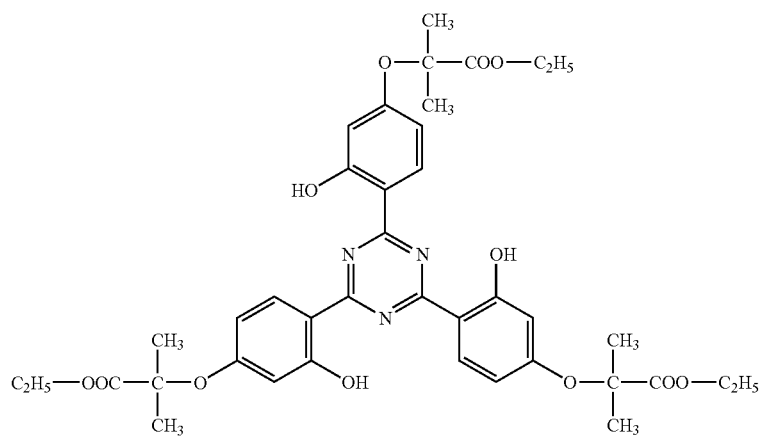
(III-38)
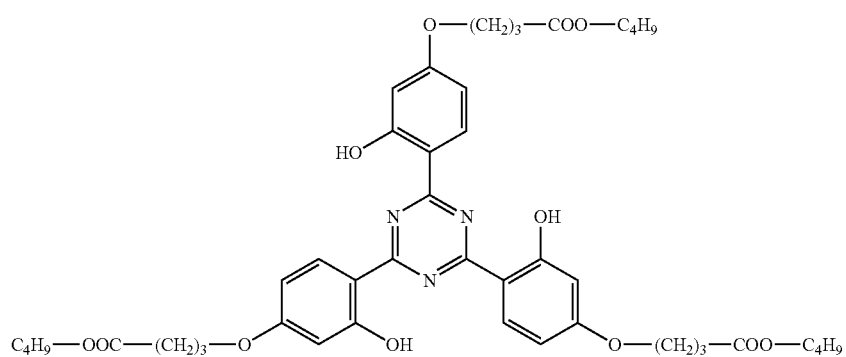
(III-39)
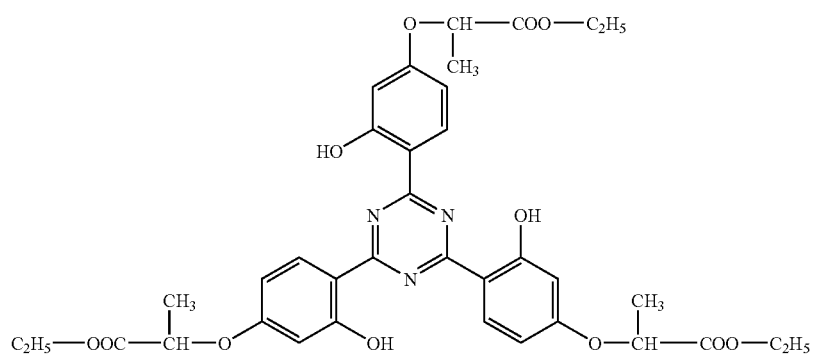
(III-40)

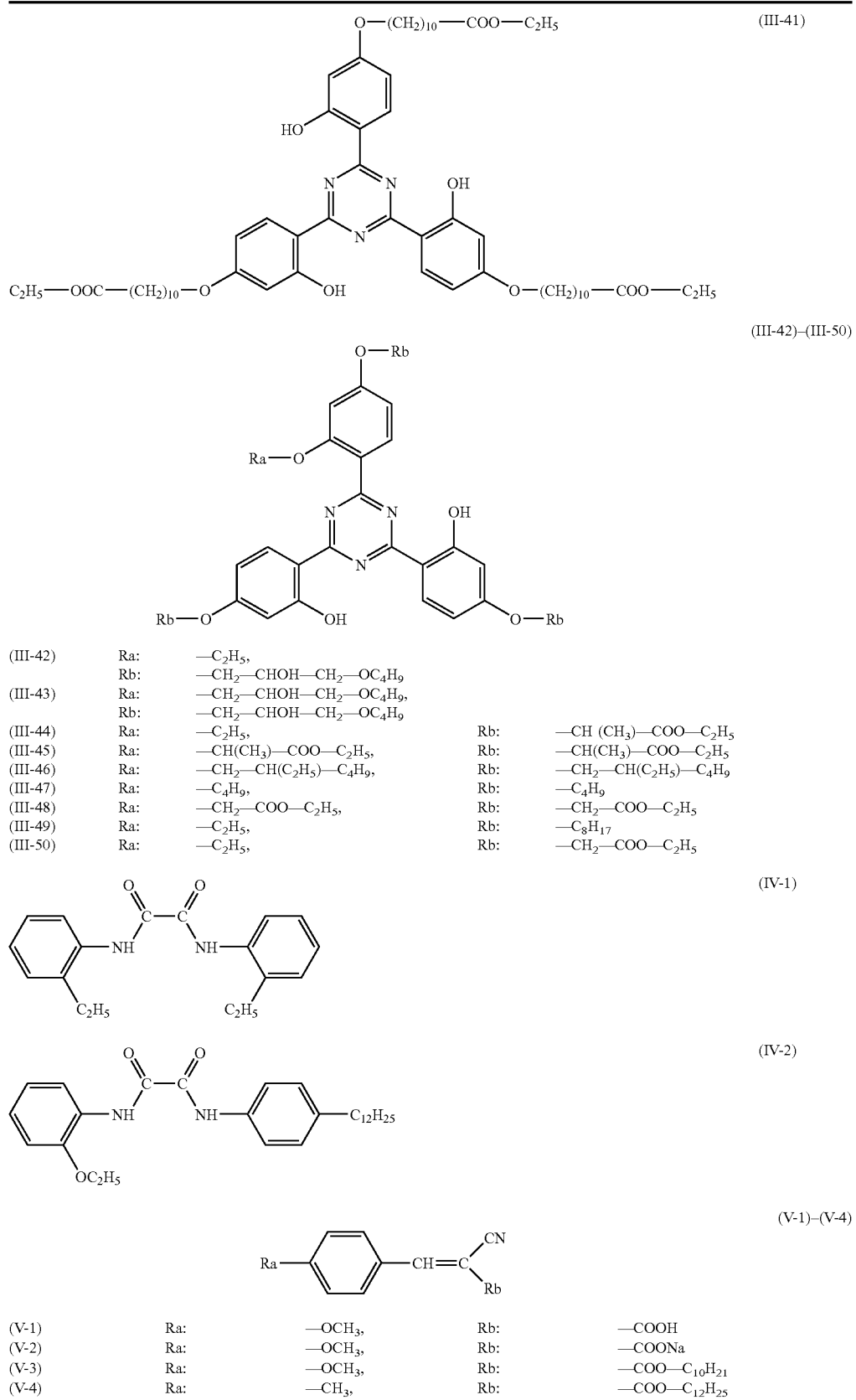

-continued
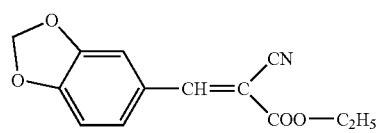 (V-5)
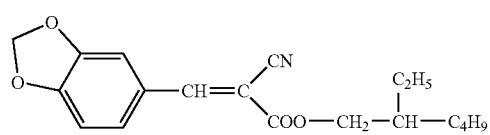 (V-6)
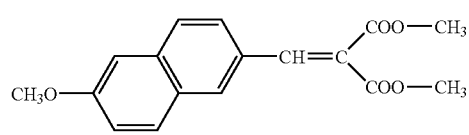 (V-7)
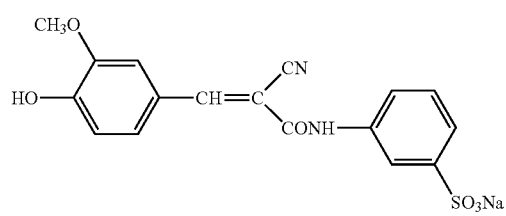 (V-8)
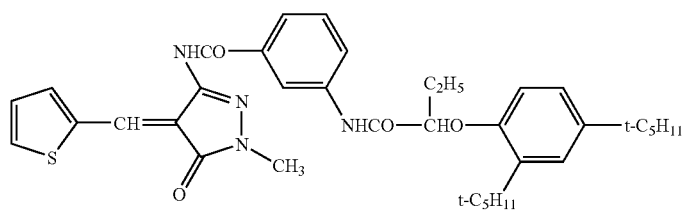 (V-9)
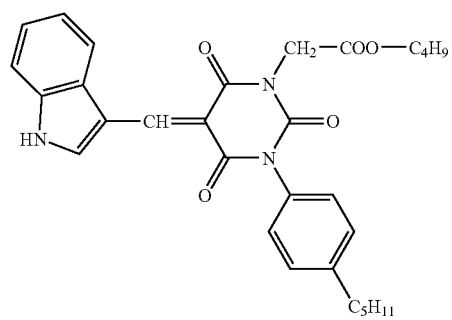 (V-10)
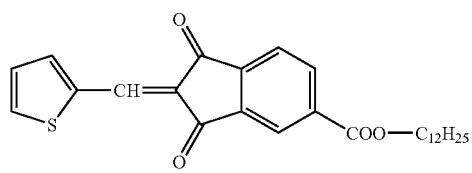 (V-11)
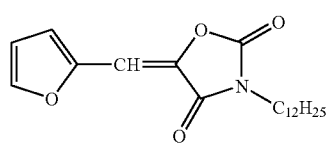 (V-12)
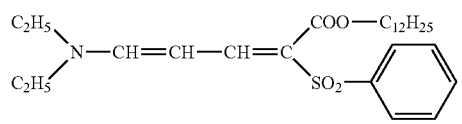 (VI-1)

-continued
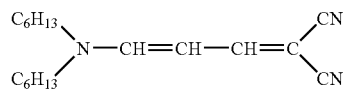 (VI-2)
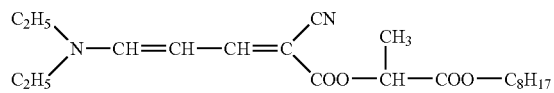 (VI-3)
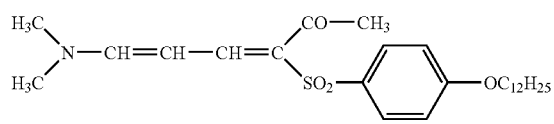 (VI-4)
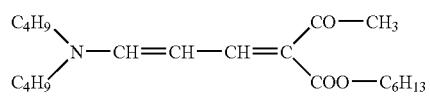 (VI-5)
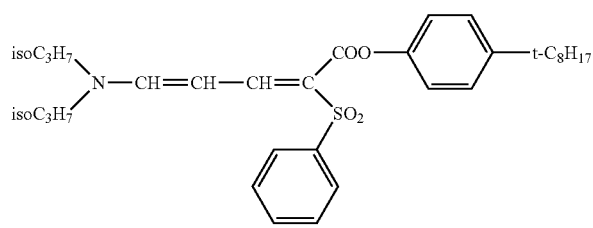 (VI-6)
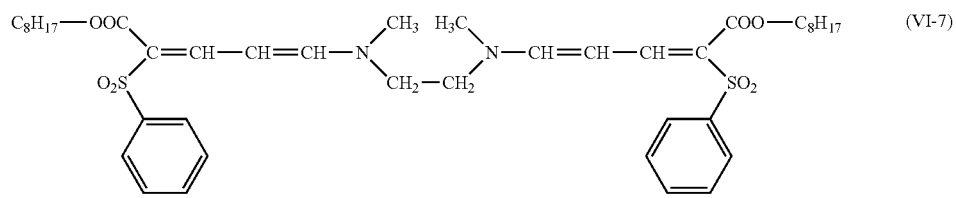 (VI-7)
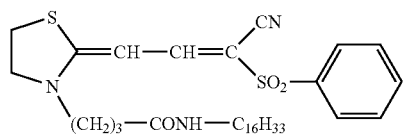 (VII-1)
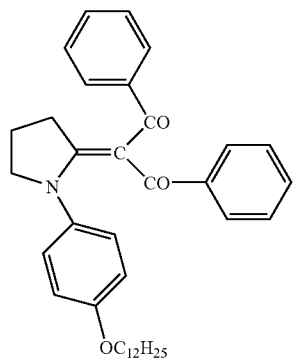 (VII-2)

-continued
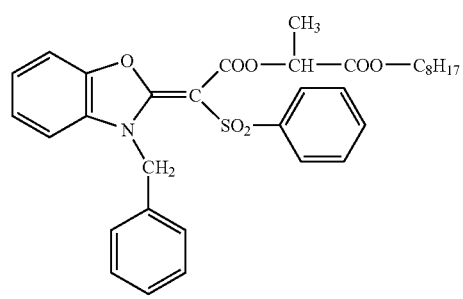
(VII-3)
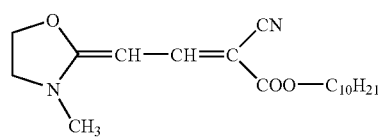
(VII-4)
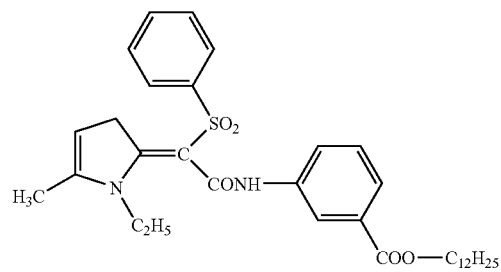
(VII-5)
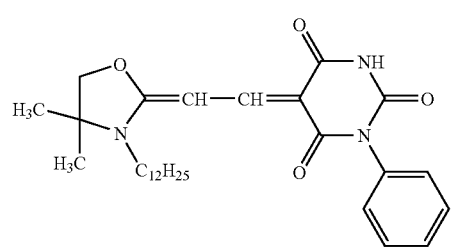
(VII-6)
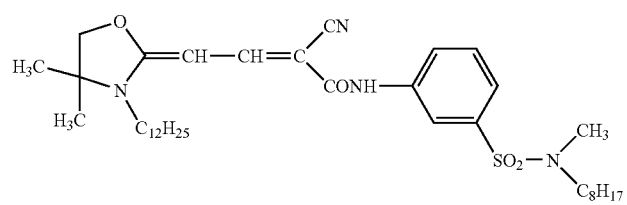
(VII-7)
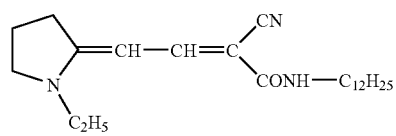
(VII-8)
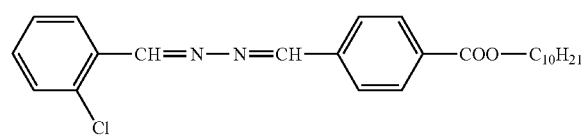
(VIII-1)

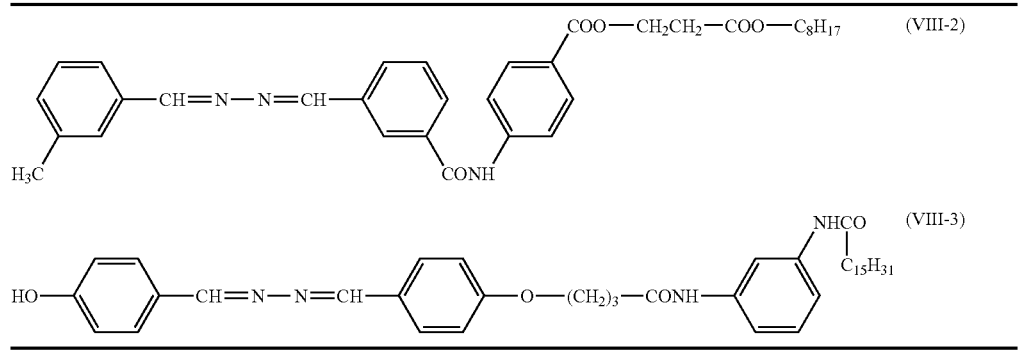

The compounds represented by the formula (I), (II), (III), (IV), (V), (VI), (VII) or (VIII) can be synthesized by referring to various documents, such as Japanese Patent Publication Nos. 36(1961)-10466, 48(1973)-5496, 48(1973)-30492, 55(1980)-36984, 55(1980)-125875, Japanese Patent Provisional Publication Nos. 46(1971)-3335, 47(1972)-10537, 51(1976)-56620, 53(1978)-128333, 58(1983)-181040, 58(1983)-214152, 58(1983)-221844, 59(1984)-19945, 63(1988)-53544, 6(1994)-211813, 7(1995)-258228, 8(1996)-53427, 8(1996)-239368, 10(1998)-115898, 10(1998)-147577, 10(1998)-182621, 8(1996)-501291, U.S. Pat. Nos. 2,719,086, 3,698,707, 3,707,375, 3,754,919, 4,220,711, 5,298,380, 5,500,332, 5,585,228, 5,814,438, British Patent No. 1,198,337, European Patent Nos. 323408A, 520938A, 521823A, 530135A, 531258A.

The structure, physical property and function of a representative ultraviolet absorbing agent is described in Andreas Valet, Light Stabilities for Paint, Vincents.

A polymer having repeating units containing a chemical structure corresponding to the formula (I), (II), (III), (IV), (V), (VI), (VII) or (VIII) can also be used as an ultraviolet absorbing agent.

Examples of the repeating units containing a chemical structure corresponding to the formula (I), (II), (III), (V) or (VI) are shown below.

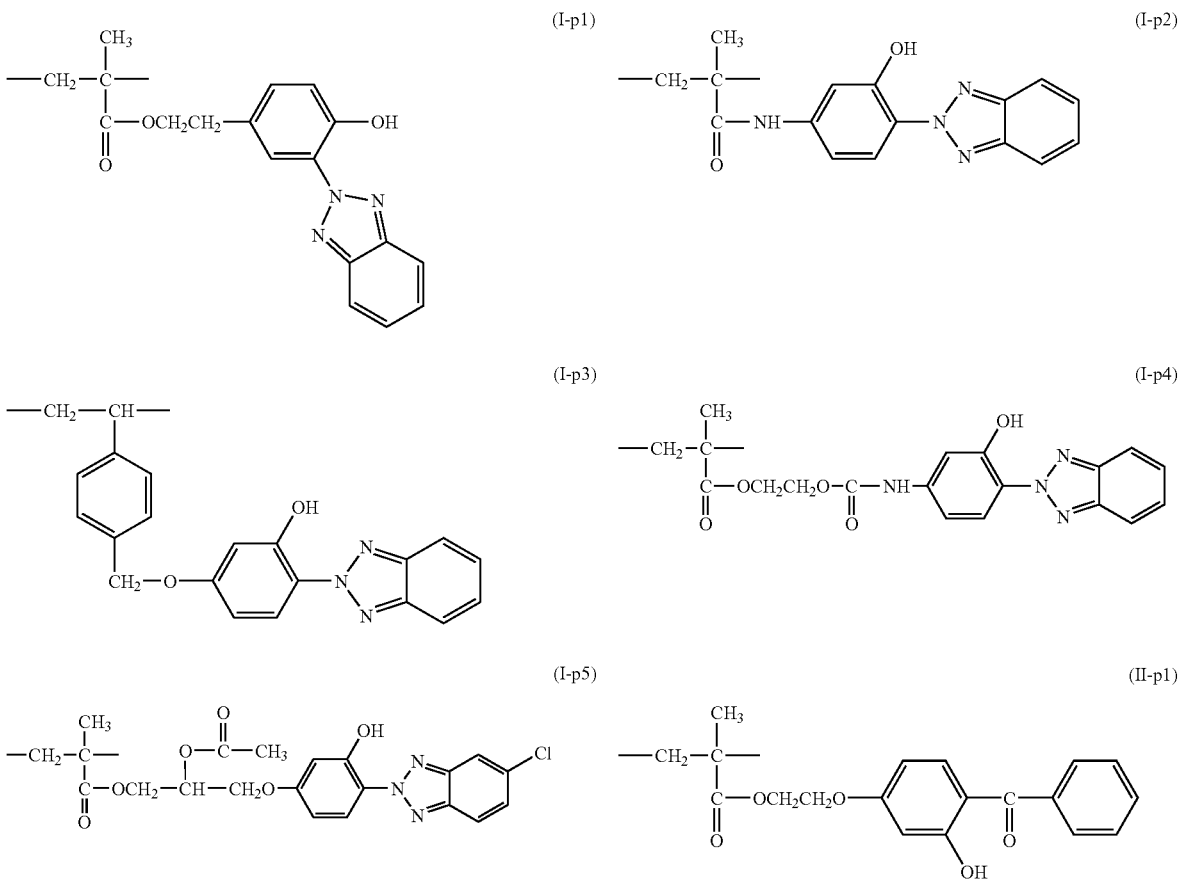

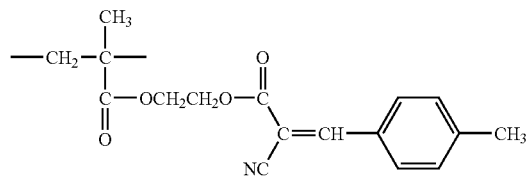 (III-p1)

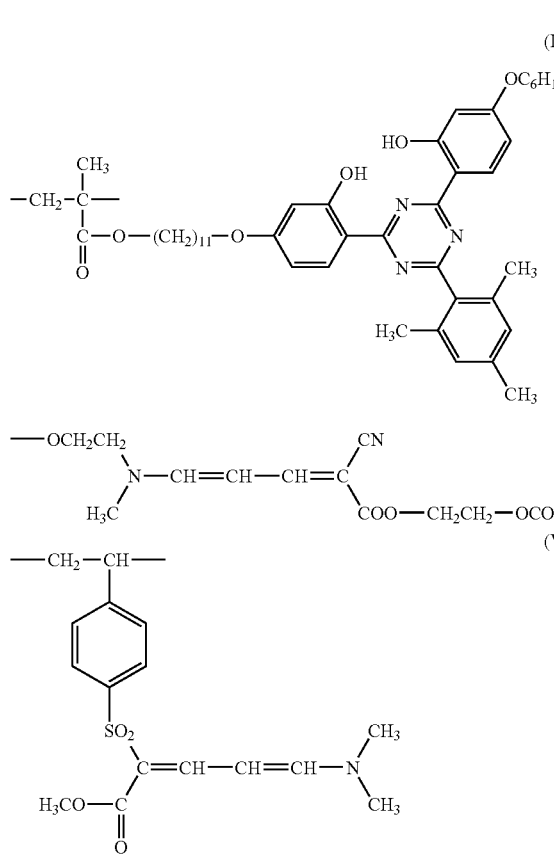 (V-p1), (VI-p1), (VI-p2), (VI-p3)

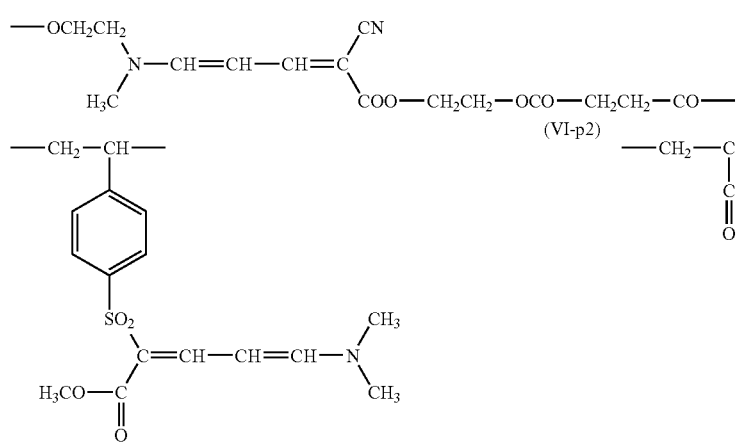

A homopolymer consisting of the above-described repeating units can be used as the ultraviolet absorbing agent. A copolymer comprising two or more of the above-described repeating units can be also used as the ultraviolet absorbing agent. Further, a copolymer comprising other repeating units can be used as the ultraviolet absorbing agent. Examples of the other repeating units are shown below.

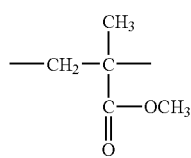 (IX-p1)

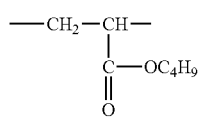 (IX-p2)

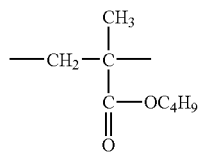 (IX-p3)

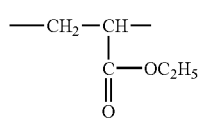 (IX-p4)

-continued

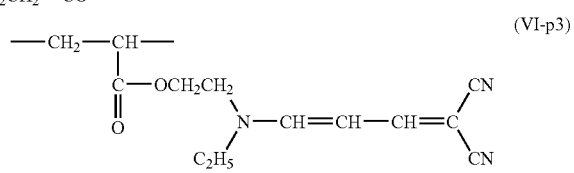 (IX-p5)

Examples of the copolymers comprising the repeating units containing a chemical structure corresponding to the formula (I), (II), (III), (V) or (VI) and the other repeating units are shown below. In the following examples, the number corresponds to the above-described repeating unit. The ratio of the repeating unit means mol %.

| | | | |
|---|---|---|---|
| P-1: | -(II-p1)$_{50}$- | -(IX-p1)$_{50}$- | |
| P-2: | -(II-p1)$_{30}$- | -(IX-p1)$_{70}$- | |
| P-3: | -(II-p1)$_{10}$- | -(IX-p1)$_{70}$- | -(IX-p2)$_{20}$- |
| P-4: | -(II-p1)$_{10}$- | -(IX-p1)$_{50}$- | -(IX-p2)$_{40}$- |
| P-5: | -(I-p1)$_{50}$- | -(IX-p3)$_{50}$- | |
| P-6: | -(I-p2)$_{32}$- | -(IX-p4)$_{65}$- | -(IX-p5)$_{3}$- |
| P-7: | -(I-p3)$_{33}$- | -(IX-p2)$_{67}$- | |
| P-8: | -(I-p4)$_{48}$- | -(IX-p2)$_{48}$- | -(IX-p5)$_{4}$- |
| P-9: | -(I-p5)$_{48}$- | -(IX-p2)$_{48}$- | -(IX-p5)$_{4}$- |
| P-10: | -(V-p1)$_{70}$- | -(IX-p1)$_{30}$- | |
| P-11: | -(VI-p2)$_{80}$- | -(IX-p1)$_{20}$- | |
| P-12: | -(VI-p3)$_{70}$- | -(IX-p2)$_{30}$- | |
| P-13: | -(III-p1)$_{20}$- | -(IX-p2)$_{80}$- | |

A polymer comprising repeating units containing a chemical structure corresponding to the formula (I) is described in Japanese Patent Provisional Publication Nos. 47(1972)-560, 58(1983)-185677, 62(1987)-24247, 63(1988)-55542, 3(1991)-139590, 4(1992)-193869, 6(1994)-82962, 8(1996)-179464 and European Patent No. 747755.

A polymer comprising repeating units containing a chemical structure corresponding to the formula (II) is described in Japanese Patent Provisional Publication Nos. 63(1988)-35660 and 2(1990)-180909.

A polymer comprising repeating units containing a chemical structure corresponding to the formula (III) is described in European Patent No. 706083.

A polymer comprising repeating units containing a chemical structure corresponding to the formula (V) is described in Japanese Patent Publication No. 63(1988)-53541 and Japanese Patent Provisional Publication No. 4(1992)-500228.

A polymer comprising repeating units containing a chemical structure corresponding to the formula (VI) is described in Japanese Patent Publication No. 1(1989)-53455, Japanese Patent Provisional Publication No. 61(1986)-189530 and European Patent No. 27242.

A polymer comprising repeating units containing a chemical structure corresponding to the formula (VII) is described in Japanese Patent Publication No. 63(1988)-53543.

A polymer comprising repeating units containing a chemical structure corresponding to other ultraviolet absorbing agents is described in Japanese Patent Provisional Publication Nos. 47(1972)-192, 61(1986)-169831, 63(1988)-53543, 63(1988)-53544, 63(1988)-56651 and European Patent No. 343246.

The ultraviolet absorbing agent can be incorporated into a structural element (layer or support) of an optical filter according to various methods. The ultraviolet absorbing agent can be directly added to a component of the element where the ultraviolet absorbing agent is miscible with the component. The ultraviolet absorbing agent can be dissolved in an auxiliary solvent miscible with the component, and the solution can be then added to the element. The ultraviolet absorbing agent can be dispersed in a high boiling point organic solvent or a polymer, and the dispersion can be then added to the element.

The high boiling point organic solvent has a boiling point preferably of high than 180° C., and more preferably of high than 200° C. The melting point of the high boiling point organic solvent is preferably lower than 150° C., and more preferably lower than 100° C.

Examples of the high boiling point organic solvents include a phosphoric ester, a phosphonic ester, a benzoic ester, a phthalic ester, a fatty acid ester, a carbonic ester, amide, ether, a halogenated hydrocarbon, an alcohol and paraffin. A phosphoric ester, a phosphonic ester, a benzoic ester and a fatty acid ester are preferred.

The high boiling point organic solvent preferably has a refractive index similar to the refractive index of a binder (e.g., gelatin) of a layer to which the solvent and the ultraviolet absorbing agent are to be added. The refractive index of the solvent is preferably lower than 1.50, and more preferably in the range of 1.43 to 1.48.

The ultraviolet absorbing agent can be added to an optical filter by referring to Japanese Patent Provisional Publication Nos. 58(1983)-209735, 63(1988)-264748, 4(1992)-191851, 8(1996)-272058 and British Patent No. 2016017A.

Two or more ultraviolet absorbing agents can be used in combination. A combination of two (preferably three) ultraviolet absorbing agents can absorb an ultraviolet ray of a wide wavelength range. Further, the dispersion of the ultraviolet absorbing agent can be stabilized by using two or more ultraviolet absorbing agents in combination.

The amount of the ultraviolet absorbing agent is preferably in the range of 0.001 to 10 g/m$^2$, more preferably in the range of 0.05 to 5 g/m$^2$, and most preferably in the range of 0.1 to 2 g/m$^2$. The absorbance of the ultraviolet ray at 360 nm is preferably more than 0.6, more preferably more than 1.0, and most preferably more than 1.5.

[Filter Layer]

The filter layer has an absorption maximum (a peak of absorption spectrum) in the wavelength region of 750 to 1,100 nm. Preferably, the filter layer has an absorption maximum in each wavelength region of 750 to 850 nm, 851 to 950 nm and 951 to 1,100 nm (more preferably in each wave-length region of 790 to 845 nm, 860 to 945 nm and 960 to 1,050 nm, and most preferably in each wavelength region of 800 to 840 nm, 870 to 940 nm, and 970 to 1,030 nm). The transmittance at each absorption maximum is preferably in the range of 0.01 to 30%, more preferably in the range of 0.05 to 20%, and most preferably in the range of 0.1 to 10%.

For obtaining the above absorption spectrum, the filter layer contains colorants (dyes or pigments).

The absorption spectrum, which has the absorption maximum in the wavelength region of 750 to 1,100 nm, preferably has no absorption band in the visible range (400 to 700 nm) so as not to lower the brightness of phosphor emission. For obtaining such preferred absorption spectrum, a dye in an aggregated form is particularly preferably used.

The dye in the aggregated form has a sharp absorption peak because the aggregated dye forms a so-called J-band. Various publications (e.g., Photographic Science and Engineering Vol. 18, No 323–335(1974)) describe the aggregated dye and the J-band. The aggregated dye generally has the absorption maximum at a longer wavelength than the dye in a solution. Accordingly, it can be easily determined by the position of the absorption maximum whether the dye is in an aggregated form or not.

In the present specification, the dye giving the absorption maximum at a wavelength longer than the dye in a solution by 30 nm or more is regarded as being in an aggregated form. The wavelength shift is preferably not less than 30 nm, more preferably not less than 40 nm, and most preferably not less than 45 nm.

Some dyes form aggregates when they are only dissolved in water, but generally aggregates are formed by adding gelatin or salts (e.g., barium chloride, potassium chloride, sodium chloride, calcium chloride) into an aqueous solution of the dye. It is particularly preferred to add gelatin into the aqueous solution.

The aggregates of dye may be in the form of dispersion of solid fine particles, which can be prepared by means of known dispersing machines. Examples of the dispersing machines include a ball mill, an oscillating ball mill, a planetary ball mill, a sand mill, a colloid mill, a jet mill and a roll mill. Japanese Patent Provisional Publication No. 52(1977)-92716 and International Patent No. 88/074794 describe dispersing machines. A vertical or horizontal medium dispersing machine is preferred.

The dispersion can be prepared in the presence of a medium (e.g., water, alcohols). A dispersing surface active agent is preferably used for dispersing. Anionic surface active agents (described in Japanese Patent Provisional Publication No. 52(1977)-92716 and International Patent No. 88/074794) are preferably used as the dispersing surface active agent. Further, anionic polymers, nonionic surface active agents or cationic surface active agents may be used, if needed.

Powder of the dye fine particles can be also obtained by dissolving the dye in an appropriate solvent and adding a poor solvent to precipitate the fine particles. The above dispersing surface active agent can be also used in this case. Crystallites of the dye, which are aggregates of the dye, can be also obtained by the steps of dissolving the dye by adjusting pH value and changing the pH value to precipitate the crystallites.

If the aggregated dye is in the form of fine particles (or crystallites), the average grain size (diameter) is preferably in the range of 0.01 to 10 μm.

The dye used in an aggregated form is preferably a methine dye (e.g., cyanine, merocyanine, oxonol, styryl), more preferably a cyanine dye or an oxonol dye.

The cyanine dye is defined by the following formula.

$$Bo-Lo=Bs$$

In the formula, Bs is a basic nucleus, Bo is an onium body of basic nucleus, and Lo is a methine chain consisting of an odd number of methines.

A cyanine dye represented by the following formula (1) is preferably used (particularly in an aggregated form).

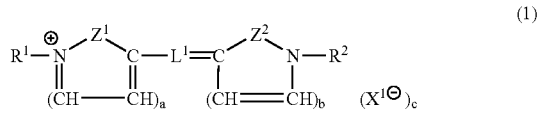

(1)

In the formula (1), each of $Z^1$ and $Z^2$ independently is a group of non-metallic atoms forming a five-membered or six-membered nitrogen-containing heterocyclic ring. The nitrogen-containing heterocyclic ring can be condensed with anther heterocyclic ring, an aromatic ring or an aliphatic ring. Examples of the nitrogen-containing heterocyclic rings and the condensed rings thereof include oxazole ring, isoxazole ring, benzoxazole ring, naphthoxazole ring, oxazolocarbazole ring, oxazolodibenzofuran ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene ring or naphthalene ring. Benzothiazole ring, naphthothiazole ring, indolenine ring and benzoindolenine ring are particularly preferred.

The nitrogen-containing heterocyclic ring and the condensed ring can have a substituent group. Examples of the substituent groups include a halogen atom, cyano, nitro, an aliphatic group, an aromatic group, a heterocyclic group, —O—R, —CO—R, —CO—O—R, —O—CO—R, —NRR, —NH—CO—R, —CO—NRR, —NH—CO—NRR, —NH—CO—O—R, —S—R, —SO₂—R, —SO₃—R, —NH—SO₂—R and —SO₂—NRR. Here each R independently is hydrogen, an aliphatic group, an aromatic group or a heterocyclic group. If R in —CO—O—R or in —SO₂—O—R is a hydrogen atom (namely the group is carboxyl or sulfo, respectively), the hydrogen atom may be dissociated or the group may be in the form of a salt.

In the present specification, the term "an aliphatic group" means an alkyl group, a substituted alkyl group, an alkenyl group, a substituted alkenyl group, an alkynyl group, a substituted alkynyl group, an aralkyl group or a substituted aralkyl group.

The alkyl group may have a cyclic structure or a branched chain structure. The alkyl group preferably has 1 to 20 carbon atoms, more preferably has 1 to 12 carbon atoms, and most preferably has 1 to 8 carbon atoms. Examples of the alkyl groups include methyl, ethyl, propyl, isopropyl, butyl, t-butyl, cyclopropyl, cyclohexyl and 2-ethylhexyl.

The alkyl moiety of the substituted alkyl group is the same as the above-described alkyl group. Examples of the substituent groups of the substituted alkyl group are the same as the substituent groups of the nitrogen-containing heterocyclic ring and the condensed ring $Z^1$ or $Z^2$ (except cyano and nitro). Examples of the substituted alkyl groups include 2-hydroxyethyl, 2-carboxyethyl, 2-methoxyethyl, 2-diethylaminoethyl, 3-sulfopropyl and 4-sulfobutyl.

The alkenyl group may have a cyclic structure or a branched structure. The alkenyl group preferably has 2 to 20 carbon atoms, more preferably has 2 to 12 carbon atoms, and most preferably has 2 to 8 carbon atoms. Examples of the alkenyl groups include vinyl, allyl, 1-propenyl, 2-butenyl, 2-pentenyl and 2-hexenyl.

The alkenyl moiety of the substituted alkenyl group is the same as the above-described alkenyl group. Examples of the substituent groups of the substituted alkenyl groups are the same as the substituent groups of the substituted alkyl group.

The alkynyl group may have a cyclic structure or a branched structure. The alkynyl group preferably has 2 to 20 carbon atoms, more preferably has 2 to 12 carbon atoms, and most preferably has 2 to 8 carbon atoms. Examples of the alkynyl groups include ethynyl and 2-propynyl.

The alkynyl moiety of the substituted alkynyl group is the same as the above-described the alkynyl group. Examples of the substituent groups of the substituted alkynyl group are the same as the substituent groups of the substituted alkyl group.

The alkyl moiety of the aralkyl group is the same as the above-described alkyl group. The aryl moiety of the aralkyl group is the same as the below-described aryl group. Examples of the aralkyl groups include benzyl and phenethyl.

The aralkyl moiety of the substituted aralkyl group is the same as the above-described aralkyl group. The aryl moiety of the substituted aralkyl group is the same as the below-described aryl group.

In the present specification, the term "an aromatic group" means an aryl group or a substituted aryl group.

The aryl group preferably has 6 to 25 carbon atoms, more preferably has 6 to 15 carbon atoms, and most preferably has 6 to 10 carbon atoms. Examples of the aryl groups include phenyl and naphthyl.

The aryl moiety of the substituted aryl group is the same as the above-described aryl group. Examples of the substituent groups of the substituted aryl group are the same as the substituent groups of the nitrogen-containing heterocyclic ring and the condensed ring $Z^1$ or $Z^2$. Examples of the substituted aryl group include 4-carboxylphenyl, 4-acetoamidephenyl, 3-methanesufoneamidephenyl, 4-methoxyphenyl, 3-carboxyphenyl, 3,5-dicarboxyphenyl, 4-methanesulfoneamide and 4-butanesulfoneamidephenyl.

The heterocyclic group can have a substituent group. The heterocyclic group preferably has a 5-membered or 6-membered heterocyclic ring. The heterocyclic ring can be condensed with an aliphatic ring, an aromatic ring or another heterocyclic ring. Examples of the heterocyclic rings (and the condensed heterocyclic rings) include pyridine ring, piperidine ring, furan ring, furfuran ring, thiophene ring, pyrrole ring, quinoline ring, morpholine ring, indole ring, imidazole ring, pyrazole ring, carbazole ring, phenothiazine ring, phenoxazine ring, indoline ring, thiazole ring, pyrazine ring, thiadiazine ring, benzoquinoline ring and thiadiazole ring.

Examples of the substituent groups of the heterocyclic ring are the same as the substituent groups of the nitrogen-containing heterocyclic ring and the condensed ring $Z^1$ or $Z^2$.

In the formula (1), each of $R^1$ and $R^2$ independently is an aliphatic group or an aromatic group, which is the same as the aliphatic group or the aromatic group described above.

In the formula (1), $L^1$ is a methine chain consisting of odd number of methines. The number of methines is preferably five or seven. The methine chain can have a substituent group. The substituent group is preferably placed at the center methine (i.e., meso-position) of the chain. Examples of the substituent groups are the same as the substituent groups of the nitrogen-containing heterocyclic ring and the condensed ring $Z^1$ or $Z^2$. Two subsistent groups of the methine chain can be combined with each other to form a five-membered or six-membered ring.

In the formula (I), each of a, b and c independently is 0 or 1. Each of a and b preferably is 0. In the case where the cyanine dye forms an intramolecular salt with an anionic substituent group such as sulfo or carboxyl, c is 0.

In the formula (I), $X^1$ is an anion. Examples of the anion include halide ion ($Cl^-$, $Br^-$, $I^-$), p-toluenesulfonic ion, ethylsulfate ion, $PF_6^-$, $BF_4^-$ and $ClO_4^-$.

The cyanine dye preferably has carboxyl group or sulfo group.

Examples of the cyanine dye are shown below.

(1-1)

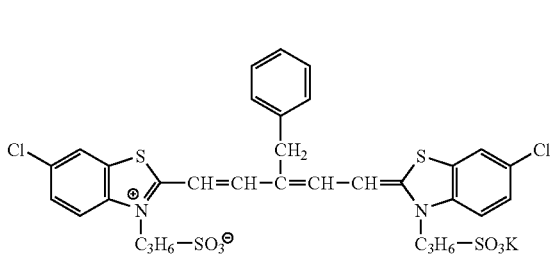

(1-2)

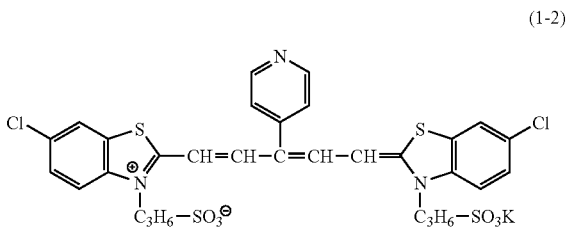

(1-3)

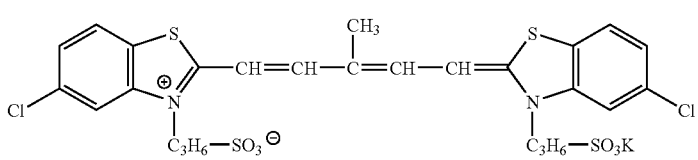

(1-4)

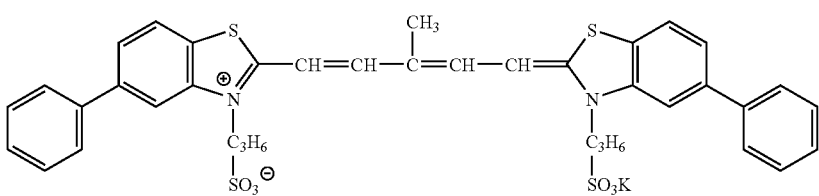

(1-5)

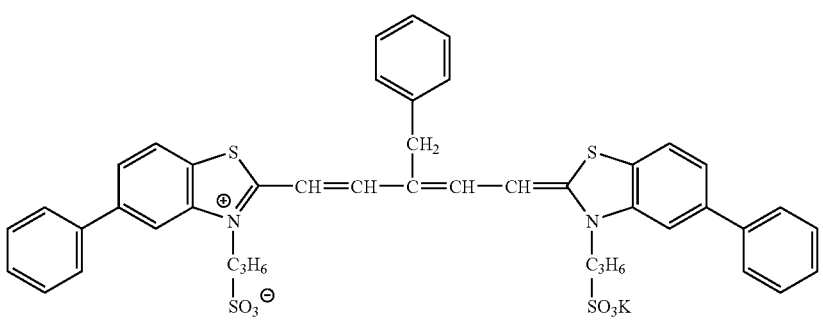

(1-6)                                                     (1-7)

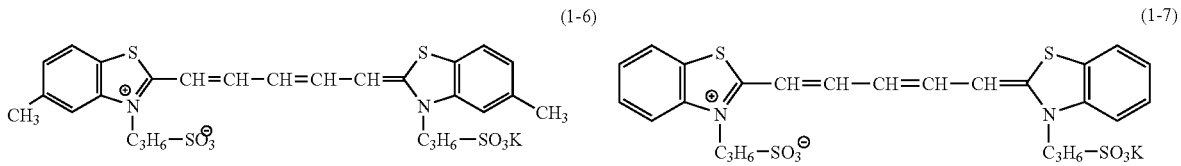

-continued
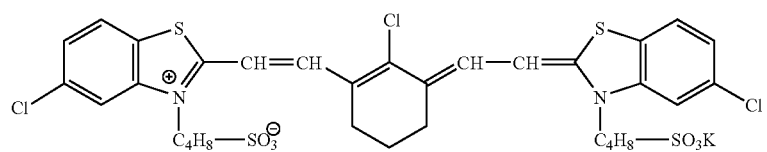
(1-8)
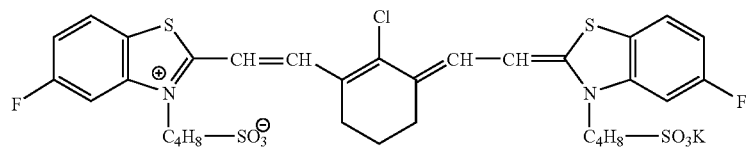
(1-9)
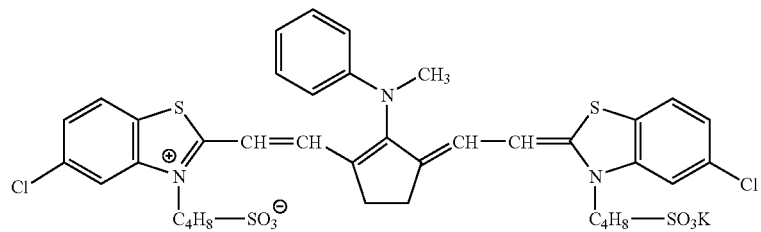
(1-10)
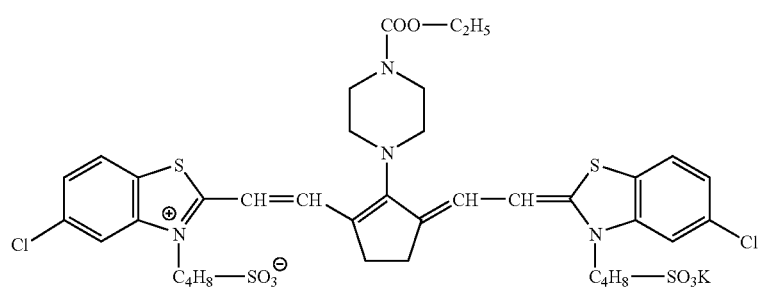
(1-11)
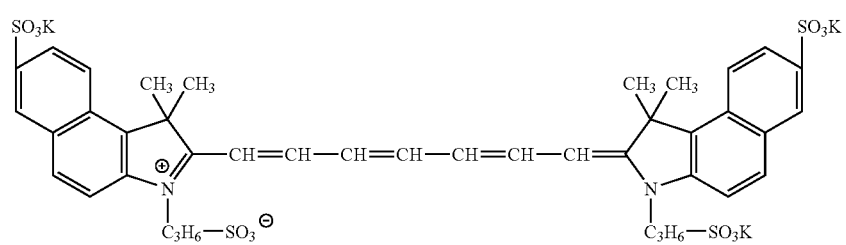
(1-12)
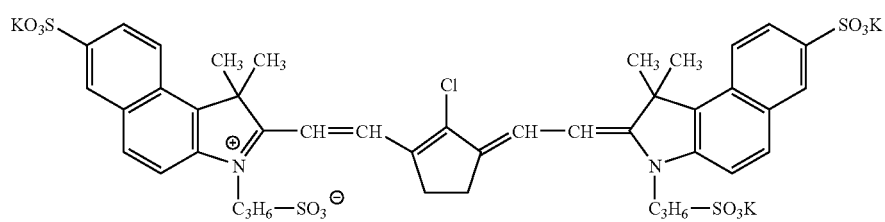
(1-13)
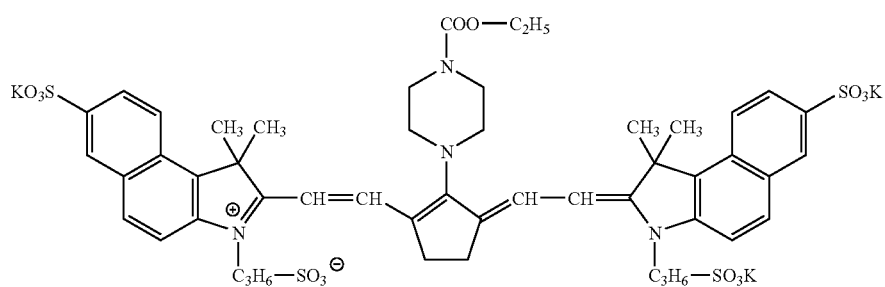
(1-14)

-continued
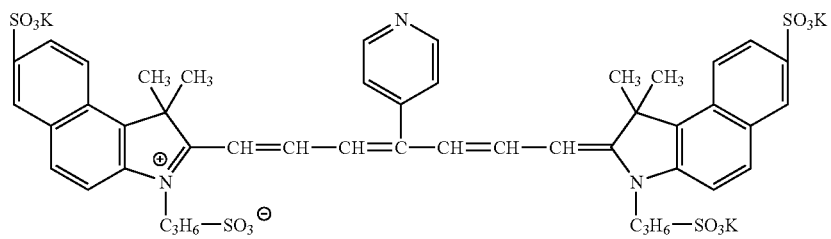
(1-15)
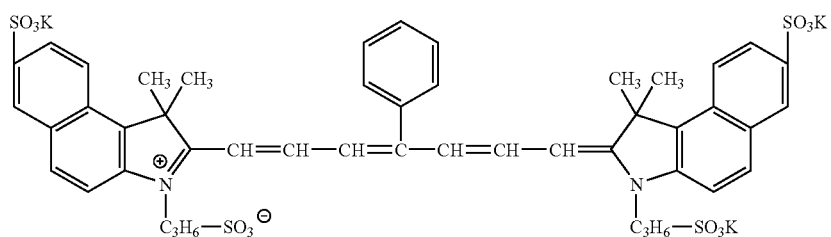
(1-16)
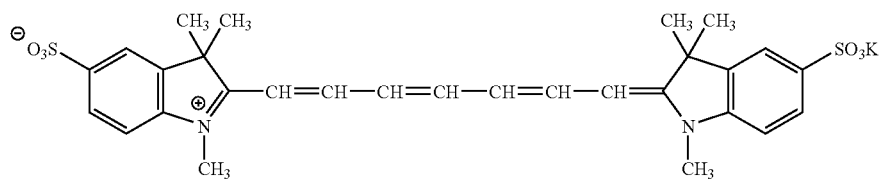
(1-17)
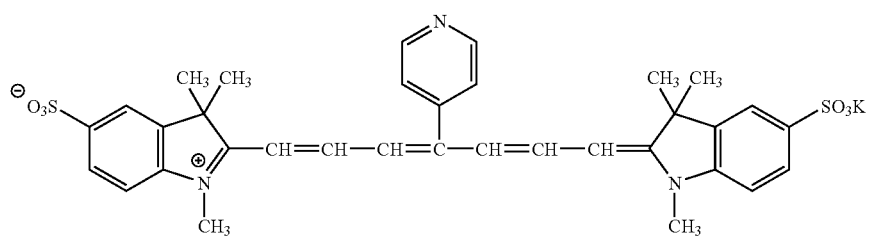
(1-18)
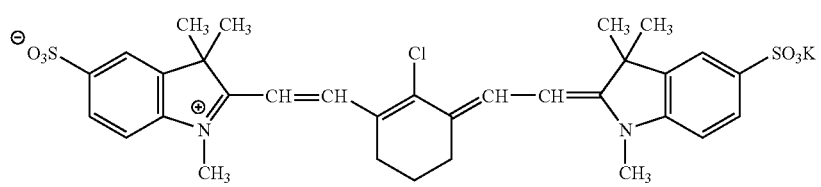
(1-19)
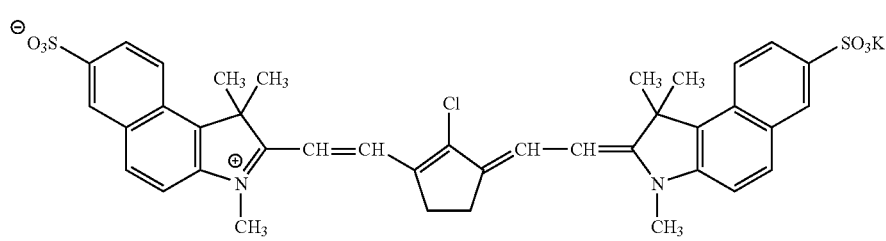
(1-20)
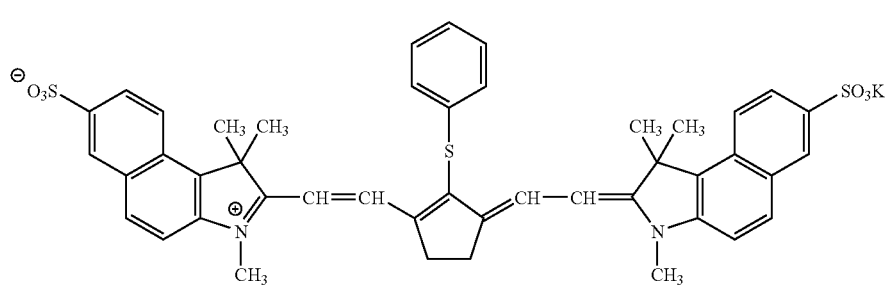
(1-21)

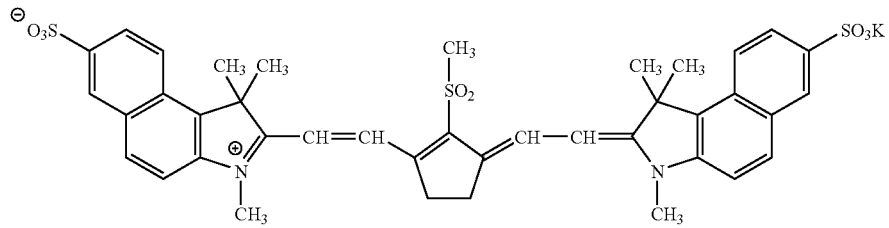

(1-22)

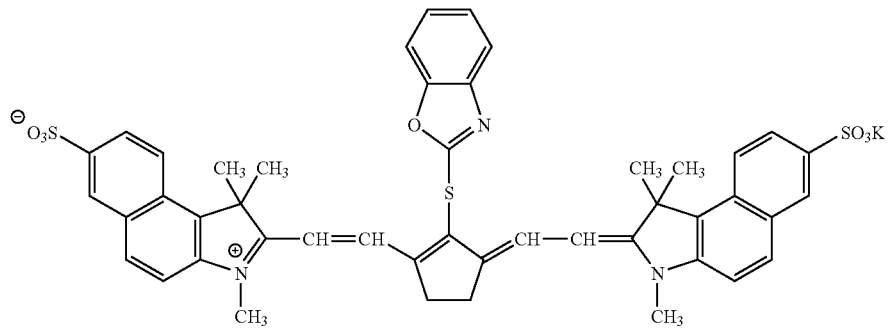

(1-23)

An oxonol dye is defined by the following formula.

*Ak=Lo–Ae*

In the formula, Ak is an acidic nucleus in a keto form, Ae is an acidic nucleus in an enol form, and Lo is a methine chain consisting of an odd number of methines.

The oxonol dye represented by the following formula (2) is preferably used (particularly in an aggregated form).

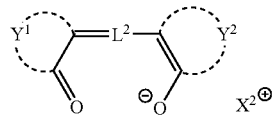

(2)

In the formula (2), each of $Y^1$ and $Y^2$ independently is a group of non-metallic atoms forming an aliphatic or heterocyclic (preferably, heterocyclic) ring. Examples of the aliphatic ring include indanedione ring. Examples of the heterocyclic ring include 5-pyrazolone ring, iso-oxazolone ring, barbituric acid ring, pyridone ring, rhodanine ring, pyrazolidinedione ring, pyrazolopyridone ring and merdramic acid ring.

The aliphatic or heterocyclic ring can have a substituent group. Examples of the substituent groups are the same as the substituent groups of the nitrogen-containing heterocyclic ring and the condensed ring $Z^1$ or $Z^2$.

In the formula (2), $L^3$ is a methine chain consisting of an odd number of methines. The number of methines is preferably 3, 5 or 7, more preferably 5. The methine chain can have a substituent group. The substituent group is preferably placed at the center methine (i.e., meso-position) of the chain. Examples of the substituent groups are the same as the substituent groups of the above-described alkyl group. Two substituent groups of the methine chain can be combined with each other to form a five-membered or six-membered ring.

In the formula (2), $X^2$ is proton or a cation.

Examples of the cation include alkali metal ions (Na, K), ammonium ion, triethylammonium ion, tributylammonium ion, pyridinium ion and tetrabutylammonium ion.

Examples of the oxonol dye represented by the formula (2) are shown below.

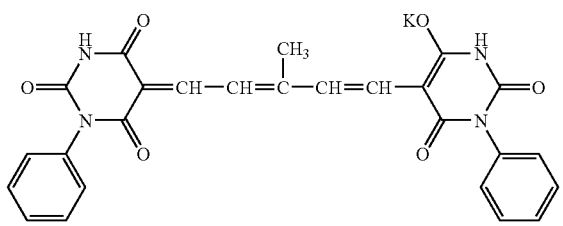

(2-1)

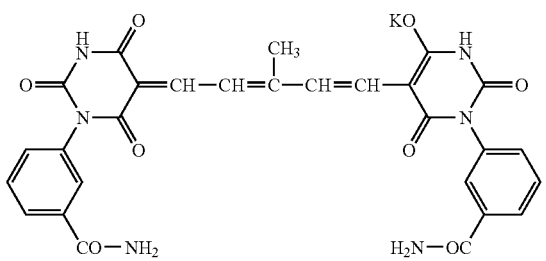

(2-2)

-continued
(2-3)
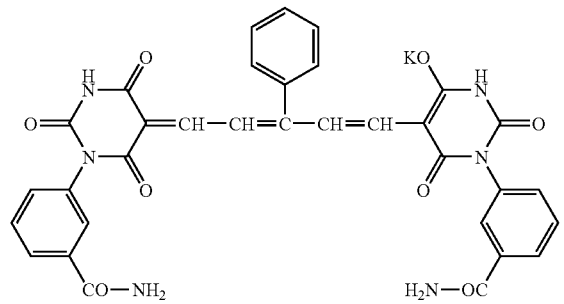
(2-4)
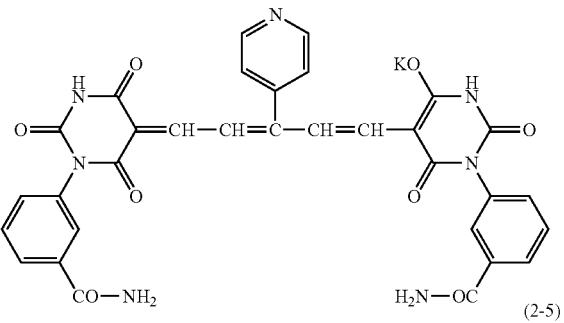
(2-5)
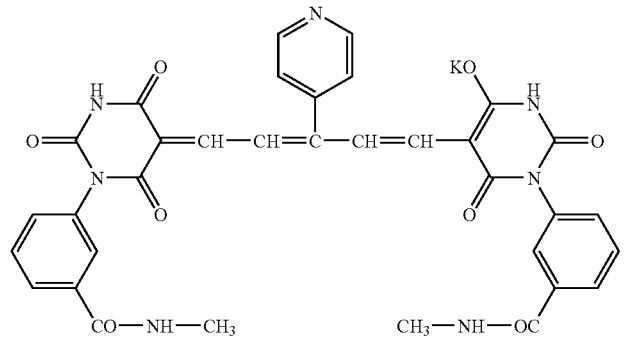
(2-6)
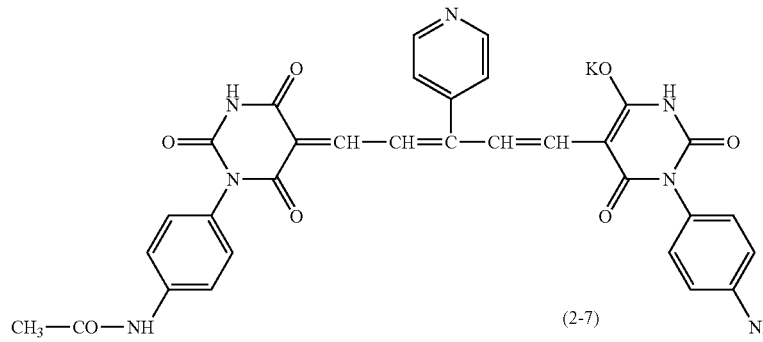
(2-7)
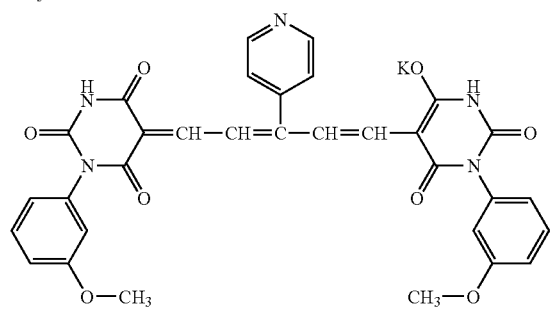
(2-8)
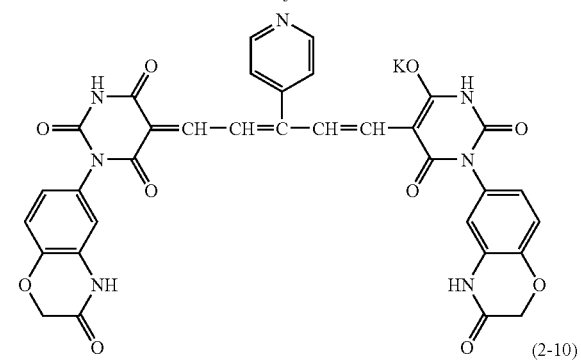
(2-9)
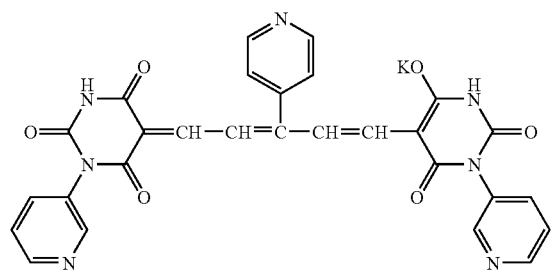
(2-10)
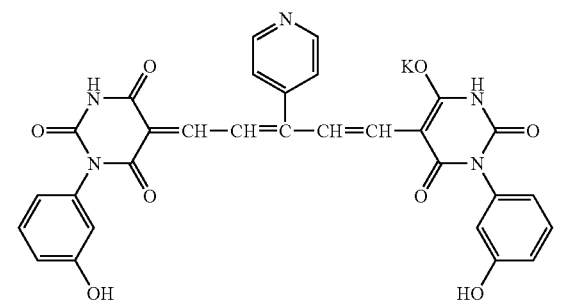

-continued (2-11)
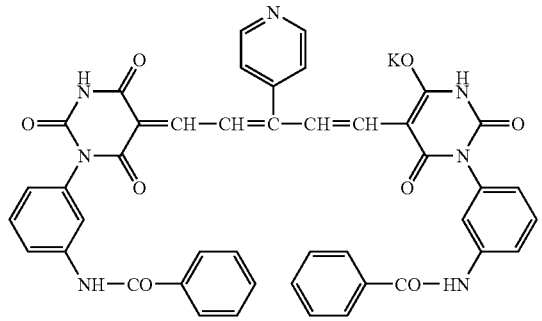

(2-12)
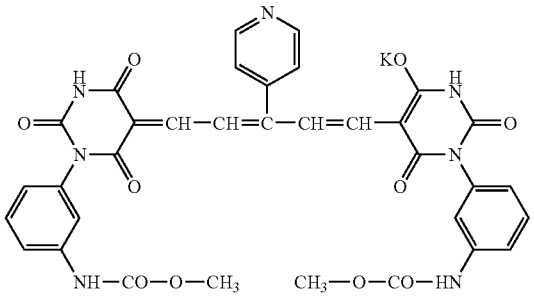

(2-13)
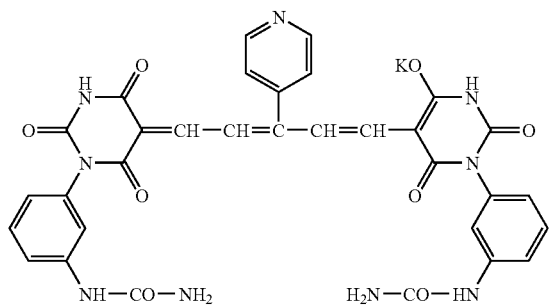

(2-14)
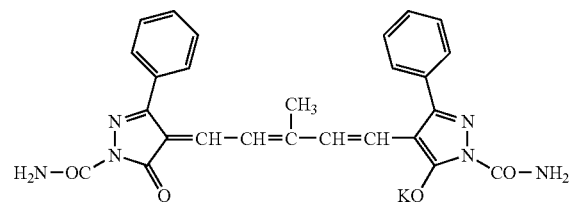

(2-15)
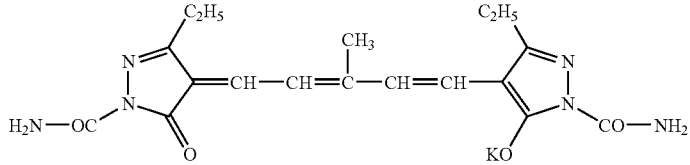

(2-16)
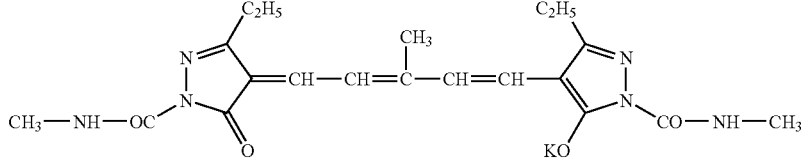

The oxonol dye of the formula (2) is preferably used for obtaining the absorption maximum in the wavelength region of 750 to 850 nm. On the other hand, for the absorption maximum in each wavelength region of 851 to 950 nm and 951 to 1,100 nm, the cyanine dye of the formula (1) is preferably used.

Preferably, in addition to the aforementioned dyes for absorbing infrared rays, the filter layer further contains a dye giving an absorption maximum in the wavelength region of 560 to 620 nm, so as to correct colors. The absorption maximum in the wavelength region of 560 to 620 nm is preferably sharp enough to cut off the light without affecting the green emission from the phosphor. The half-width of the peak is in the range of preferably 5 to 100 nm, more preferably 10 to 70 nm, and most preferably 10 to 50 nm.

The above preferred absorption pattern is given by a dye represented by the following general formula:

In the above formula, each of P and Q is independently an acidic nucleus, a basic nucleus or an aromatic ring; and L is a methine chain consisting of 1 to 5 conjugated methines or azamethines. Each bond represented by a solid line and a broken line means that the set of P and L or the set of Q and L is connected through a single bond or a double bond, and its bond order is determined so that P, L and Q may be linked through a conjugated chain to form a chromophore. Each of P, L and Q may have substituent groups, and the substituent groups may be connected to form a 4- to 7-membered ring. For example, cyclobutenone (e.g., squarilium dye) can be formed with a ring at the methine chain. Further, xanthene or thioxanthene can be formed by connecting the substituent groups of P and Q.

The acidic nucleus may be a cyclic ketomethylne compound or an open-chained compound having a methylene group between electron-attractive groups. The acidic nucleus is preferably a cyclic ketomethylne compound, and may be condensed with another heterocyclic, aromatic or aliphatic ring. As the cyclic acidic nucleus, a heterocyclic ring is preferred to an aromatic one. Further, the acidic nucleus may show tautomer-like behavior. For example, it shows keto-enol tautomerism in oxonol dye. Like that, the acidic nucleus may show imino-amino tautomerism (in the case where oxygen atom in keto-enol tautomerism is replaced with nitrogen atom) or thioketo-thiol tautomerism (in the case where oxygen atom in keto-enol tautomerism is replaced with sulfur atom). Furthermore, the acidic nucleus may be dissociated. Examples of the acidic nucleus and the condensed ring thereof include 2-pyrazoline-5-one, rhodanine, hydantoin, thiohydantoin, 2,4-oxazolidinedione, iso-oxazolone, barbituric acid, thiobarbituric acid, indandione, di-oxopyrazolopyridine, hydroxypyridine, pyrazolidinedione, 2,5-dihydrofuran-2-one, pyrroline-2-one, pyrazolotriazole and pyrrolotriazole. These may have substituent groups.

The basic nucleus may have an open-chained structure or a cyclic structure. The basic nucleus preferably has a cyclic structure, and may be condensed with another hetero-cyclic, aromatic or aliphatic ring. As the cyclic basic nucleus, a nitrogen-containing heterocyclic ring is preferred. The basic nucleus may be an onium body (which can be found in cyanine dye). Examples of the nitrogen-containing heterocyclic ring and the condensed ring thereof include oxazole, iso-oxazole, benzoxazole, naphthoxazole, oxazolocarbazole, oxazolodibenzofuran, thiazole, benzothiazole, naphthothiazole, indolenine, benzoindolenine, imidazole, benzoimidazole, naphthoimidazole, quinoline, pyridine, oxazoline, pyrrolopyridine, pyrrole, furopyrrole, indolizine, imidazoquinoxaline and quinoxaline. These may have substituent groups.

The aromatic ring may be a carbocyclic ring or a heterocyclic ring, and preferably has a substitutent group (an amino group, hydroxyl or an alkoxyl group) at a position where the substituent can be conjugated with the methine chain represented by L. Examples of the carbocyclic ring include benzene and naphthalene. Examples of the heterocyclic ring include pyrrole, indole, indolenine, benzoindolenine, carbazole, furopyrrole, thiophene, benzothiophene, furan, benzofuran, dibenzofuran, oxazole, benzooxazole, naphthoxazole, iso-oxazole, thiazole, benzothiazole, naphthothiazole, iso-thiazole, pyrazole, imidazole, indazole, naphthoimidazole, benzoimidazole, indolizine, quinoline, phenothiazine, phenoxazine, indoline, pyridine, pyridazine, thiadiazine, pyran, thiopyran, oxadiazole, benzoquinoline, thiadiazole, pyrrolothiazole, pyrrolopyridazine, pyrrolopyridine, imidazoquinoline, imidazoquinoxaline, tetrazole, coumarin and coumarone. These may have substituent groups.

Examples of the dye represented by the above general formula include methine dye (e.g., cyanine, merocyanine, oxonol, pyrromethene, styryl, allylidene), diphenylmetane dye, triphenylmetane dye, xanthene dye, squarilium dye, croconium dye, azine dye, acridine dye, thiazine dye and oxazine dye.

These dyes are preferably used in aggregated forms. The aggregated dye exhibits a sharp absorption peak because of so-called J-band. Various publications (e.g., Photographic Science and Engineering Vol. 18, No 323–335(1974)) describe the aggregated dye and J-band. The aggregated dye generally exhibits the absorption maximum at a longer wavelength than the dye in a solution, and hence it can be easily determined by the position of the absorption maximum whether the dye in the filter layer is in an aggregated form or not. The dye giving the absorption maximum at a wavelength longer than the dye in a solution by 30 nm or more is regarded as being in an aggregated form. The wavelength shift is preferably not less than 30 nm, more preferably not less than 40 nm, and most preferably not less than 45 nm. The dye used in an aggregated form is preferably methine dye, more preferably cyanine dye or oxonol dye.

These dyes can be used together with metals to form metal complexes. In the form of metal complex, the dye has improved durability. Pyrromethene dye is preferably used in the form of metal complex.

Concrete examples of the dyes are described in Japanese Patent Application Nos. 10(1998)-316875, 11(1999)-276525, 11(1999)-36046, 11(1999)-252731, 11(1999)-121699, 11(1999)-124273, 2000-40694; Japanese Patent Provisional Publication Nos. 11(1999)-92682, 11(1999)-255774, 11(1999)-256057 and 11(1999)-227332.

Oxonol dye or cyanine dye in an aggregated form is further preferred, and the cyanine dye represented by the following formula (3) is particularly preferred.

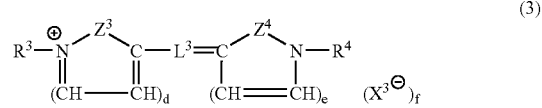

In the formula (3), $Z^3$ and $Z^4$ are the same as $Z^1$ and $Z^2$ in the formula (1), respectively. The groups $R^3$ and $R^4$ are the same as $R^1$ and $R^2$ in the formula (1), respectively. $L^3$ is a methine chain consisting of an odd number of methines, and the number of methines is preferably 5. Each of d, e and f independently is 0 or 1. $X^3$ is the same as $X^1$ in the formula (1).

Examples of the dye represented by the formula (3) are shown below:

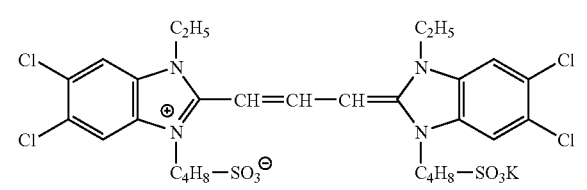

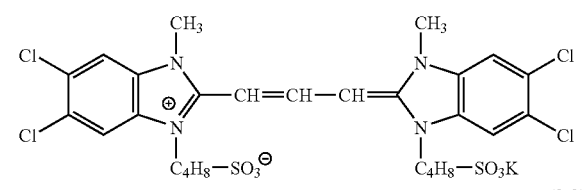

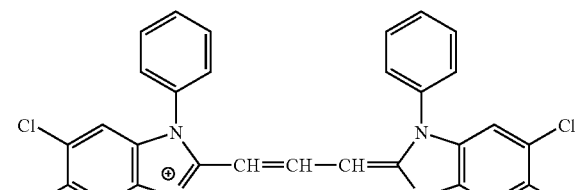

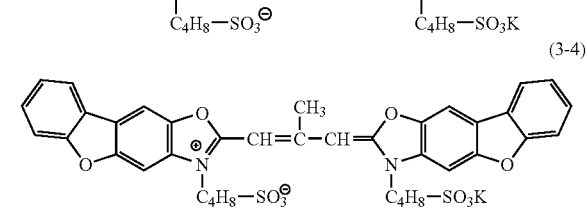

-continued (3-5)
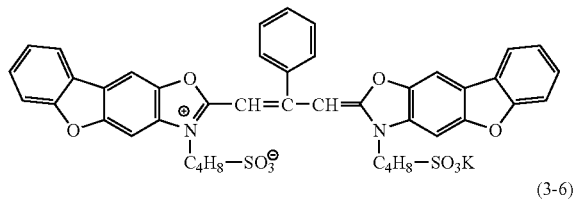

(3-6)
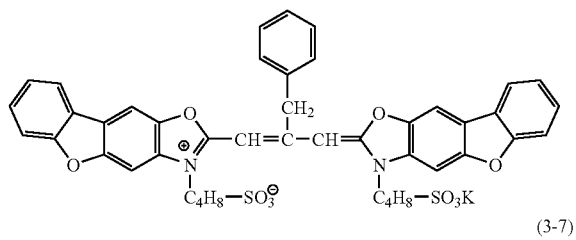

(3-7)
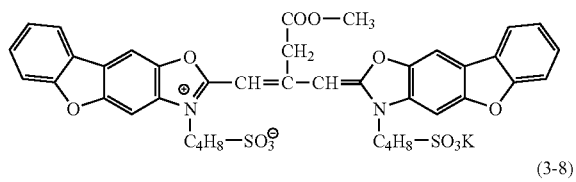

(3-8)
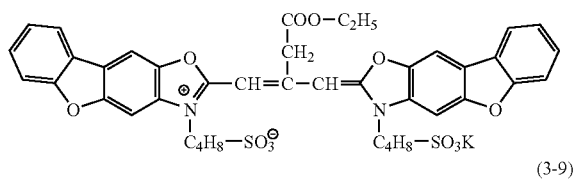

(3-9)
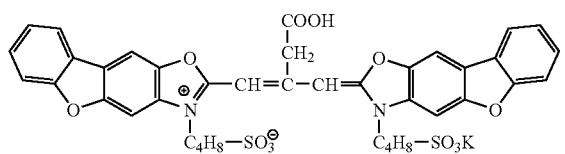

The optical filter preferably shows another absorption maximum in the wavelength region of 500 to 550 nm. The transmittance in this wavelength region is preferably in the range of 20 to 85%.

Because of the absorption maximum in the wavelength region of 500 to 550 nm, the filter can adjust intensity of green luminescence (which exhibits high luminosity) emitted from the phosphor. It is preferred that the green luminescence be gently cut off. The half width (the width of the wavelength region giving half of the maximum absorbance) of the absorption maximum in the wavelength region of 500 to 550 nm is within the range of preferably 30 to 300 nm, more preferably 40 to 300 nm, further preferably 50 to 150 nm, and most preferably 60 to 150 nm.

Squarylium dyes, azomethine dyes, cyanine dyes, oxonol dyes, anthraquinone dyes, azo dyes, benzylidene dyes and metal chelate compounds thereof are preferably used as the dye giving the absorption maximum in the wavelength region of 500 to 550 nm.

Further, dyes giving an absorption maximum in the wavelength regions of 350 to 450 nm and 470 to 530 nm are also preferably used for adjusting color tones. Preferred examples of the dyes include squarilium compounds, azomethine compounds, cyanine compounds, merocyanine compounds, oxonol compounds, anthraquinone compounds, azo compounds, benzylidene compounds and metal chelate compounds thereof.

The cyanine dye can be prepared according to "Heterocyclic Compounds Cyanine Dyes and Related Compounds" by F. M. Harmer (John Wiley & Sons, 1964); "Heterocyclic Compounds Special Topics in Heterocyclic Chemistry" chapter 18, section 14, pp. 482–515, by D. M. Sturmer (John Wiley & Sons, 1977); "Rodds Chemistry of Carbon Compounds" 2nd. Ed. vol. IV, part B, chapter 15, pp. 369–422 (Elsevier Science Publishing Company Inc., 1977); and Japanese Patent Provisional Publication Nos. 5(1993)-88293 and 6(1994)-313939.

The oxonol dye represented by the formula (2) can be prepared according to Japanese Patent Provisional Publication No. 7(1995)-230671, European Patent No. 0,778,493 and U.S. Pat. No. 5,459,265.

The filter layer may contain anti-fading agent.

Examples of the anti-fading agent, which functions as a stabilizing agent for the dyes, include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455 and 2,062,888, and Japanese Patent Provisional Publication No. 61(1986)-90155), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729 and 61(1986)-90156), hydroquinone monoether or p-aminophenol derivatives (described in British Patent Publication Nos. 1,347,556, 2,066,975, Japanese Patent Publication No. 54(1979)-12337 and Japanese Patent Provisional Publication No. 55(1980)-6321), and bisphenol derivatives (described in U.S. Pat. No. 3,700,455 and Japanese Patent Publication No. 48(1973)-31625).

Further, singlet oxygen quenchers and metal complexes (described in U.S. Pat. No. 4,245,018, and Japanese Patent Provisional Publication No. 60(1985)-97353) can be also used as the anti-fading agent. Examples of the singlet oxygen quencher include nitroso compounds (described in Japanese Patent Provisional Publication No. 2(1990)-300288), diimmonium compounds (described in U.S. Pat. No. 0,465,612), nickel complexes (described in Japanese Patent Provisional Publication No. 4(1992)-146189) and oxidation inhibitors (described in European Patent Publication No. 820057A1).

The filter layer may contain two or more dyes in combination.

The filter layer has a thickness of preferably 0.1 μm to 1 cm, more preferably 0.5 μm to 100 μm.

Preferably, the filter layer further contains a binder polymer. Examples of the binder polymer include natural polymers (e.g., gelatin, cellulose derivatives, alginic acid) and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Preferred polymers are hydrophilic ones (e.g., the afore-mentioned natural polymers, polyvinyl butyral, polyvinyl pyrrolidone, polyvinyl alcohol, water-soluble polyimide).

[Transparent Support]

Examples of the materials for the support include cellulose esters (e.g., diacetyl cellulose, triacetyl cellulose (TAC), propionyl cellulose, butyryl cellulose, acetyl propionyl cellulose, nitrocellulose), polyamides, polycarbonate, polyesters (e.g., polyethylene terephthalate, polyethylene naphthalate, poly-1,4-cyclohexanedimethylene terephthalate, polyethylene-1,2-diphenoxyethane-4,41-dicarboxylate, polybutylene terephthalate), polystyrenes (e.g., syndiotactic polystyrene), polyolefins (e.g., poly-propylene, polyethylene, polymethylpentene), polymethyl methacrylate, syndiotactic polystyrene, polysulfone, polyethersulfone, polyether ketone, polyether imide and polyoxyethylene. Triacetyl cellulose (TAC), polycarbonate and polyethylene terephthalate are preferred.

The thickness of the transparent support is in the range of preferably 5 μm to 5 cm, more preferably 25 μm to 1 cm, and most preferably 80 μm to 1.2 mm.

The transparent support preferably has a transmittance of more than 80%, and more preferably more than 86%. The haze of the support is preferably in the range of less than 2.0%, and more preferably less than 1.0%. The support preferably has a refractive index of 1.45 to 1.70.

The support may contain an infrared (IR) absorbing agent. The amount of the infrared absorbing agent is preferably in the range of 0.01 to 20 wt. % and more preferably 0.05 to 10 wt. % based on the total weight of the support. The support may further contain particles of an inert inorganic compound as a slipping agent. Examples of the inorganic compound include $SiO_2$, $TiO_2$, $BaSO_4$, $CaCO_3$, talc and kaolin.

The support may be subjected to surface treatment. Examples of the surface treatment include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment and UV treatment are more preferred. For enhancing the adhesion between the support and the layer provided thereon, an undercoating layer may be provided on the support.

[Undercoating Layer]

An undercoating layer is preferably provided between the transparent support and the filter layer. The undercoating layer is preferably prepared from a polymer having a modulus of elasticity at room temperature in the range of 1.000 to 1 MPa, preferably 800 to 5 MPa, and more preferably 500 to 10 MPa.

The undercoating layer has a thickness of preferably 2 nm to 20 μm, more preferably 5 nm to 5 μm, and most preferably 50 nm to 1 μm.

The polymer in the undercoating layer preferably has a glass transition temperature of −60° C. to 60° C. The polymer having a glass transition temperature of −60° C to 60° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether.

Two or more undercoating layers can be provided on the support.

[Anti-Reflection Layers]

The optical filter can have an anti-reflection layer, which gives a reflectance preferably in the range of not more than 3.0%, and more preferably in the range of not more than 1.8%.

As the anti-reflection layer, a low refractive index layer is essential. The refractive index of the low refractive index layer is lower than that of the support, and is preferably in the range of 1.20 to 1.55 (more preferably, 1.30 to 1.55).

The low refractive index layer preferably has a thickness of 50 to 400 nm, more preferably 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702 and 7(1995)-168004), a layer formed by sol-gel method (disclosed in Japanese Patent Provisional Publication Nos. 5(1993)-208811, 6(1994)-299091 and 7(1995)-168003), and a layer containing fine particles (disclosed in Japanese Patent Publication No. 60(1985)-59250 and Japanese Patent Provisional Publication Nos. 5(1993)-13021, 6(1994)-56478, 7(1995)-92306 and 9(1997)-288201). The low refractive index layer containing fine particles may further contain micro voids among the particles. The void ratio in that layer is preferably in the range of 3 to 50 vol. %, more preferably in the range of 5 to 35 vol. %.

Besides the low refractive index layer, layers having higher refractive indexes (i.e., middle and high refractive index layers) are preferably provided to reduce the reflection in a wide wavelength region.

The high refractive index layer has a refractive index preferably in the range of 1.65 to 2.40, more preferably in the range of 1.70 to 2.20. The middle refractive index layer has a refractive index between those of the low and high refractive index layers. The refractive index of the middle refractive index layer is preferably in the range of 1.50 to 1.90.

Each of the middle and high refractive index layers has a thickness preferably in the range of 5 nm to 100 μm, more preferably in the range of 10 nm to 10 μm, and most preferably in the range of 30 nm to 1 μm. The haze of each layer is in the range of preferably not more than 5%, more preferably not more than 3%, further preferably not more than 1%.

The middle and high refractive index layers can be formed from a binder polymer having a relatively high refractive index. Examples of that binder polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80. As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide, and zirconium oxide. The inorganic fine particles may contain other elements, as well as those oxides or sulfides of main component. The "main component" here means the component contained in the largest content (wt. %). Examples of the other elements include Ti, Zr, Sn, Sb, Cu, Fe, Mn, Pb, Cd, As, Cr, Hg, Zn, Al, Mg, Si, P and S.

The middle and high refractive index layers may be formed from liquid or soluble film-formable inorganic materials. Examples of the materials include alkoxides of various elements, salts of organic acids, coordination compounds (e.g., chelate compounds), and active inorganic polymers.

The surface of the anti-reflection layer can be made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

[Electromagnetic Shielding Layer]

The optical filter can have an electromagnetic shielding layer having a surface resistance in the range of 0.1 to 500 $\Omega/m^2$, preferably 0.1 to 10 $\Omega/m^2$. Since the electro-magnetic shielding layer is placed on the optical filter or on the anti-reflection layer, it is preferred to be transparent. Known transparent electroconductive layers can be used as the electromagnetic shielding layer.

As the transparent electroconductive layer, a thin film of metal or metal oxide is preferably used. Preferred metals are noble metals (gold, silver, palladium and alloy thereof), and alloy of gold and silver is particularly preferred. The alloy contains silver preferably in an amount of not less than 60 wt. %. Examples of preferred metal oxide include $SnO_2$, ZnO, ITO and $In_2O_3$.

The thin metal oxide film may be superposed on the thin metal film. If so, the metal oxide film protects the metal film from oxidization, and consequently improves the transmittance for visible light. Preferred metal oxides for the superposed film are oxides of 2- to 4-valent metals (e.g., zirconium oxide, titanium oxide, magnesium oxide, silicone oxide, aluminum oxide). Further, a thin film of metal alkoxide compound can be also superposed on the thin metal film. The thin films of metal oxide or metal alkoxide compound can be provided on both sides of the metal film. In that case, the thin metal oxide or metal alkoxide compound films on both sides may be different from each other.

The thin metal film has a thickness of preferably 4 to 40 nm, more preferably 5 to 35 nm, most preferably 6 to 30 nm.

The thin metal oxide or metal alkoxide compound film has a thickness of preferably 20 to 300 nm, more preferably 40 to 100 nm.

The electromagnetic shielding layer can be formed by spattering method, vacuum deposition method, ion plating method, plasma CVD method or plasma PVD method. The layer can be also formed by applying a coating liquid dispersing particles of metal or metal oxide.

[Infrared Shielding Layer]

An infrared shielding layer can be independently provided. The aforementioned infrared absorbing dyes may be incorporated therein. The infrared shielding layer preferably shades near infrared rays in the wavelength range of 750 to 1,100 nm. The infrared shielding layer can be formed from a resin mixture containing an infrared shielding component. Examples of the infrared shielding component in the resin mixture include copper (described in Japanese Patent Provisional Publication No. 6(1994)-118228), a copper compound or a phosphor compound (described in Japanese Patent Provisional Publication No. 62(1987)-5190), a copper compound or a thiourea compound (described in Japanese Patent Provisional Publication No. 6(1994)-73197) and tungsten compounds (described in U.S. Pat. No. 3,647,772). Instead of providing the infrared shielding layer, the resin mixture may be incorporated in the transparent support.

The thin silver layer described as the electromagnetic wave shielding layer can also function as the infrared shielding layer.

[Other Layers]

The optical filter can further comprise a hard coating layer, a slippery layer, an anti-stain layer, an antistatic layer or an intermediate layer.

The hard coating layer preferably contains a crosslinked polymer, and can be formed from acrylic, urethane or epoxy polymer, oligomer or monomer (e.g., UV curable resin). The hard coating layer can be also formed from silica material.

On the top surface of the optical filter, a slippery layer may be provided. The slippery layer gives slipperiness to the surface of the anti-reflection layer, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

An anti-stain layer can be formed from a fluorine-containing polymer. The thickness of the anti-stain layer is preferably in the range of 2 to 100 nm, more preferably in the range of 5 to 30 nm.

The layers such as the anti-reflection layers (middle, high, and low refractive index layers), the filter layer, the undercoating layer, the hard coating layer, the slippery layer and other layers can be formed by known coating methods. Examples of the coating method include dip coating, air knife coating, curtain coating, roller coating, wire bar coating, gravure coating, and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp. 253, written by Y. Harazaki, published by Asakura Shoten (1973).

[Use of Optical Filter]

The optical filter of the invention can be applied on a display device such as a liquid crystal display (LCD), a plasma display panel (PDP), an electroluminescence display (ELD) or a cathode ray tube display (CRT). In the case where the optical filter has an anti-reflection layer, the optical filter is so arranged on the device that the surface opposite to the low refractive index layer is attached to the display surface. The optical filter of the invention is particularly effective in a plasma display panel (PDP).

EXAMPLE 1

(Formation of Undercoating Layer)

Both surfaces of a transparent polyethylene terephthalate film (thickness: 175 µm) were subjected to corona discharge treatment, and latex of styrene-butadiene copolymer was applied on one surface to form an undercoating layer (thickness: 130 nm).

(Formation of Second Undercoating Layer)

A gelatin solution containing acetic acid and glutaraldehyde was applied on the undercoating layer to form a second undercoating layer (thickness: 50 nm).

(Formation of Low Refractive Index Layer)

To 2.50 g of a reactive fluorocarbon polymer (JN-7219, JSR Co., Ltd.), 1.3 g of t-butanol was added. The mixture was stirred at the room temperature for 10 minutes, and then filtered through a polypropylene filter (porosity size: 1 μm) to prepare a coating solution for a low refractive index layer. The coating solution was applied on the support surface opposite to the second undercoating layer, by means of a bar coater. The applied layer was dried and hardened at 120° C. for 15 minutes to form a low refractive index layer (thickness: 110 nm).

(Formation of Ultraviolet Absorbing Layer)

At 50° C., 10 g of the ultraviolet absorbing agent (I-6), 17 ml of a mixture of the following high boiling point solvents (1) and (2) [weight ratio: 2:1] and 9 ml of ethyl acetate were mixed to prepare a solution of the ultraviolet absorbing agent. The solution was added to 50 g of 20% gelatin aqueous solution containing 6 ml of 10% aqueous solution of sodium dodecylbenzenesufonate, and emulsified by means of a high-speed emulsifying stirrer at 5,000 rpm for 20 minutes. After emulsifying, water was added to prepare 170 g of an emulsion.

The emulsion containing the ultraviolet absorbing agent was applied on the second undercoating layer to form an ultraviolet absorbing layer (dry thickness: 3.5 μm).

High boiling point solvents (1) and (2)

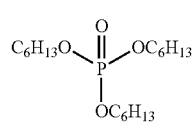
(1)

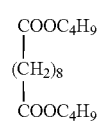
(2)

(Formation of Filter Layer)

To 180 g of 10 wt. % gelatin aqueous solution, 1 N sodium hydroxide aqueous solution was added to adjust the pH value at 7. To the solution, 24.5 mg/m² of aggregated dye (2-7), 45.9 mg/m² of aggregated dye (1-12) and 29.1 mg/m² of aggregated dye (1-13) were added and stirred for 24 hours at 30° C. The thus-prepared coating solution was applied on the support surface of the undercoating layer (thickness: 300 nm) side, and dried for 10 minutes at 120° C. to form a filter layer (thickness: 3.5 μm). Thus, an optical filter was prepared.

(Measurement of Absorbance)

The absorption spectrum of the prepared optical filter was measured. The optical filter had absorption maxima at 810 nm, 904 nm and 985 nm. The transmittances at 810 nm, 904 nm and 985 nm were 5%, 1% and 3%, respectively. The absorption maximum ($\lambda_{max}$) of each dye in a solvent was shown below.

| Dye (2–7): | 620 nm/DMF |
| Dye (1–12): | 780 nm/H₂O |
| Dye (1–13): | 386 nm/H₂O |

EXAMPLE 2

The procedure of Example 1 was repeated except that 9.0 g of the ultraviolet absorbing agent (I-3) and 1.0 g of the ultraviolet absorbing agent (I-11) were used in place of 10 g of the ultraviolet absorbing agent (I-6), to prepare an optical filter.

EXAMPLE 3

The procedure of Example 1 was repeated except that a mixture of 4.5 g of the ultraviolet absorbing agent (I-17), 4.5 g of the ultraviolet absorbing agent (I-2) and 1.0 g of the ultraviolet absorbing agent (I-9) was used in place of 10 g of the ultraviolet absorbing agent (I-6), to prepare an optical filter.

EXAMPLE 4

The procedure of Example 1 was repeated except that 10 g of the ultraviolet absorbing agent (I-2) was used in place of 10 g of the ultraviolet absorbing agent (I-6), to prepare an optical filter.

EXAMPLE 5

The procedure of Example 1 was repeated except that a mixture of 8.3 g of the ultraviolet absorbing agent (II-1) and 1.7 g of the ultraviolet absorbing agent (II-11) was used in place of 10 g of the ultraviolet absorbing agent (I-6), to prepare an optical filter.

EXAMPLE 6

The procedure of Example 1 was repeated except that 10 g of the ultraviolet absorbing agent (III-33) was used in place of 10 g of the ultraviolet absorbing agent (I-6), to prepare an optical filter.

EXAMPLE 7

The procedure of Example 1 was repeated except that a mixture of 9.0 g of the ultraviolet absorbing agent (III-46) and 1.0 g of the ultraviolet absorbing agent (III-38) was used in place of 10 g of the ultraviolet absorbing agent (I-6), to prepare an optical filter.

EXAMPLE 8

The procedure of Example 1 was repeated except that 10 g of the ultraviolet absorbing agent (III-5) was used in place of 10 g of the ultraviolet absorbing agent (I-6), to prepare an optical filter.

COMPARISON EXAMPLE 1

The procedure of Example 1 was repeated except that aggregated dyes (2-7), (1-12) and (1-13) were not used to prepare an optical filter.

COMPARISON EXAMPLE 2

The procedure of Example 1 was repeated except that the ultraviolet absorbing layer was not provided to prepare an optical filter.

(Test of Installed Optical Filter)

Each prepared optical filter was attached with an adhesive on the front surface of the front plate of a plasma display panel (PDS4202J-H, Fujitsu Limited), so that the filter layer might face the front plate.

A remote-controlled TV set was placed in front of the display panel, and it was tested whether the display panel caused faulty working of the TV set or not. As the result, the display panel equipped with the optical filter of Comparison Example 1 often caused faulty working, while the display panels with the optical filters of Examples 1 to 8 and Comparison Example 2 caused no faulty working.

(Test of Light Resistance)

Light (100,000 lux) of a xenon lamp without UV filter was applied onto each prepared optical filter for 200 hours, so that the surface opposite to the filter layer might be exposed to the light.

The thus-treated optical filter was evaluated in the same manner as described above. As the result, the display panel equipped with the optical filters of Comparison Examples 1 and 2 often caused faulty working, while the display panels with the optical filters of Examples 1 to 8 caused no faulty working.

EXAMPLE 9

(Preparation of Support)

45 Weight parts of cellulose acetate (average acetylation degree: 60.9%), 1.50 weight parts of the ultraviolet absorbing agent (I-14), 2.75 weight parts of triphenyl phosphate (plasticizer), 2.20 weight parts of biphenyldiphenyl phosphate (plasticizer), 232.75 weight parts of methylene chloride, 42.57 weight parts of methanol and 8.50 weight parts of n-butanol were mixed to prepare a solution (dope).

The dope was cast on a band (length: 6 m) to form a transparent support (dry thickness: 100 μm).

(Formation of Undercoating Layer)

Gelatin dispersed in a mixture of methanol and acetone was applied on one surface of the support, and dried to form an undercoating layer (thickness: 200 nm).

(Formation of Hard Coating Layer)

25 Weight parts of dipentaerythritolhexaacrylate (DPHA, Nippon Kayaku Co., Ltd), 25 weight parts of urethaneacrylate oligomer (UV-6300B, Nippon Gosei Kagaku Kogyo Co., Ltd.), 2 weight parts of photopolymerization initiator (Irgacure 907, Ciba-Geigy) and 0.5 weight part of a sensitizer (Kayacure DETX, Nippon Kayaku Co., Ltd.) were dissolved in 50 weight parts of methyl ethyl ketone to prepare a coating solution. The coating solution was applied on the support surface opposite to the undercoating layer, by means of a bar coater. The applied layer was dried and exposed to ultraviolet rays to form a hard coating layer (thickness: 6 μm).

(Formation of Low Refractive Index Layer)

A coating solution for low refractive index layer was prepared in the same manner as in Example 1. From the coating solution, a low refractive index layer is formed on the hard coating layer in the same manner as in Example 1.

(Formation of Filter Layer)

A coating solution for filter layer was prepared in the same manner as in Example 1. The solution was applied on the undercoating layer, and dried for 10 minutes at 120° C. to form a filter layer (thickness: 3.5 μm). Thus, an optical filter was prepared.

EXAMPLE 10

The procedure of Example 9 was repeated except that 1.50 weight parts of the ultraviolet absorbing agent (I-15) was used in place of 1.50 weight parts of the ultraviolet absorbing agent (I-14), to prepare an optical filter.

EXAMPLE 11

The procedure of Example 9 was repeated except that a mixture of 1.20 weight parts of the ultraviolet absorbing agent (I-6) and 0.30 weight parts of the ultraviolet absorbing agent (I-13) was used in place of 1.50 weight parts of the ultraviolet absorbing agent (I-14), to prepare an optical filter.

EXAMPLE 12

The procedure of Example 9 was repeated except that 1.50 weight parts of the ultraviolet absorbing agent (II-9) was used in place of 1.50 weight parts of the ultraviolet absorbing agent (I-14), to prepare an optical filter.

EXAMPLE 13

The procedure of Example 9 was repeated except that a mixture of 0.75 weight parts of the ultraviolet absorbing agent (II-3) and 0.75 weight parts of the ultraviolet absorbing agent (II-18) was used in place of 1.50 weight parts of the ultraviolet absorbing agent (I-14), to prepare an optical filter.

EXAMPLE 14

The procedure of Example 9 was repeated except that 1.50 weight parts of the ultraviolet absorbing agent (III-22) was used in place of 1.50 weight parts of the ultraviolet absorbing agent (I-14), to prepare an optical filter.

EXAMPLE 15

The procedure of Example 9 was repeated except that 1.50 weight parts of the ultraviolet absorbing agent (III-5) was used in place of 1.50 weight parts of the ultraviolet absorbing agent (I-14), to prepare an optical filter.

EXAMPLE 16

The procedure of Example 9 was repeated except that a mixture of 1.00 weight parts of the ultraviolet absorbing agent (III-35) and 0.50 weight parts of the ultraviolet absorbing agent (III-41) was used in place of 1.50 weight parts of the ultraviolet absorbing agent (I-14), to prepare an optical filter.

COMPARISON EXAMPLE 3

The procedure of Example 9 was repeated except that aggregated dyes (2-7), (1-12) and (1-13) were not used to prepare an optical filter.

COMPARISON EXAMPLE 4

The procedure of Example 1 was repeated except that the ultraviolet absorbing agent (I-14) was not used to prepare an optical filter.

(Test of Installed Optical Filter)

Each prepared optical filter was attached with an adhesive on the front surface of the front plate of a plasma display panel (PDS4202J-H, Fujitsu Limited), so that the filter layer might face the front plate.

A remote-controlled TV set was placed in front of the display panel, and it was tested whether the display panel caused faulty working of the TV set or not. As the result, the display panel equipped with the optical filter of Comparison Example 3 often caused faulty working, while the display panels with the optical filters of Examples 1 to 8 and Comparison Example 4 caused no faulty working.

(Test of Light Resistance)

Light (100,000 lux) of a xenon lamp without UV filter was applied onto each prepared optical filter for 200 hours, so that the surface opposite to the filter layer might be exposed to the light.

The thus-treated optical filter was evaluated in the same manner as described above. As the result, the display panel equipped with the optical filters of Comparison Examples 3 and 4 often caused faulty working, while the display panels with the optical filters of Examples 9 to 16 caused no faulty working.

EXAMPLE 17

(Formation of Filter Layer)

To 180 g of 10 wt. % gelatin aqueous solution, 1 N sodium hydroxide aqueous solution was added to adjust the pH value at 7. To the solution, 20.0 mg/m² of aggregated dye (3-8), 24.5 mg/m² of aggregated dye (2-7), 45.9 mg/m² of aggregated dye (1-12), 29.1 mg/m² of aggregated dye (1-13) and 120 mg/m² of the following dye (C2) were added and stirred for 24 hours at 30° C. The thus-prepared coating solution was applied on the surface of the UV absorbing layer prepared in Example 1, and dried for 10 minutes at 120° C. to form a filter layer (thickness: 3.5 μm). Thus, an optical filter was prepared.

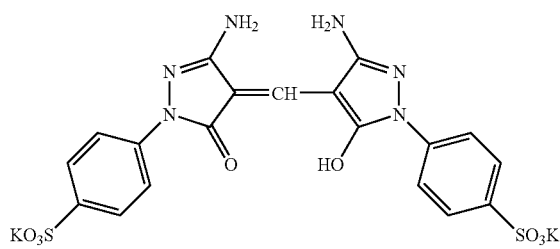

(C2)

(Formation of Low Refractive Index Layer)

To 2.50 g of a reactive fluorocarbon polymer (JN-7219, JSR Co., Ltd.), 1.5 g of t-butanol was added. The mixture was stirred at the room temperature for 10 minutes, and then filtered through a polypropylene filter (porosity size: 1 μm) to prepare a coating solution for a low refractive index layer. The coating solution was applied on the support surface opposite to the filter layer, by means of a bar coater. The applied layer was dried at 120° C. for 30 minutes to form a low refractive index layer (thickness: 90 nm).

On the low refractive index layer and on the surface of the transparent support, a mesh of metal thin film was laminated with an acrylic adhesive.

(Test of Installed Optical Filter)

The prepared optical filter was attached with an adhesive on the front surface of the front plate of a plasma display panel (PDS4202J-H, Fujitsu Limited), so that the filter layer might face the front plate.

A remote-controlled TV set was placed in front of the display panel, and it was tested whether the display panel caused faulty working of the TV set or not. As the result, the display panel caused no faulty working.

(Test of Light Resistance)

Light (100,000 lux) of a xenon lamp without UV filter was applied onto the prepared optical filter for 200 hours, so that the surface opposite to the filter layer might be exposed to the light.

The thus-treated optical filter was evaluated in the same manner as described above. As the result, the display panel caused no faulty working.

EXAMPLE 18

(Preparation of Optical Filter)

An optical filter was prepared in the same manner as in Example 17, except that 80.0 mg/m² of the following dye (C3) was added to the filter layer.

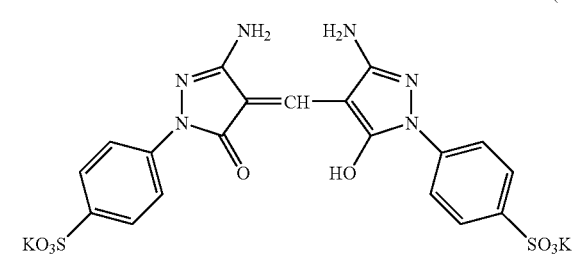

(C3)

(Test of Installed Optical Filter)

The prepared optical filter was attached with an adhesive on the front surface of the front plate of a plasma display panel (PDS4202J-H, Fujitsu Limited), so that the filter layer might face the front plate.

A remote-controlled TV set was placed in front of the display panel, and it was tested whether the display panel caused faulty working of the TV set or not. As the result, the display panel caused no faulty working.

(Test of Light Resistance)

Light (100,000 lux) of a xenon lamp without UV filter was applied onto the prepared optical filter for 200 hours, so that the surface opposite to the filter layer might be exposed to the light.

The thus-treated optical filter was evaluated in the same manner as described above. As the result, the display panel caused no faulty working.

(Measurement of Absorption Spectrum)

The absorption spectrum of the prepared optical filter was measured. The measured spectrum is shown in FIG. 1.

What is claimed is:

1. A plasma display panel having a display surface covered with an optical filter, wherein the optical filter comprises a transparent support and a filter layer, said filter layer having an absorption maximum in each wavelength region of 300 to 390 nm, 560 to 620 nm, 750 to 850 nm, 851 to 950 nm and 951 to 1,100 nm.

2. The plasma display panel as defined in claim 1, wherein the optical filter is directly attached to the display surface.

3. The plasma display panel as defined in claim 1, wherein the support, the filter layer or an optional layer contains an ultraviolet absorbing agent exhibiting an absorption maximum in the wavelength region of 300 to 390 nm.

4. The plasma display panel as defined in claim 3, wherein the ultraviolet absorbing agent is represented by the formula (I), (II), (III), (IV), (V), (VI), (VII) or (VIII):

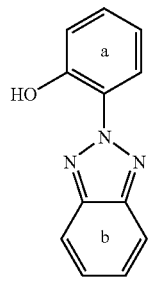
(I)

in which the benzene rings a and b may have a substituent group;

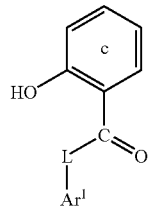
(II)

in which $Ar^1$ is an aryl group or an aromatic heterocyclic group, —L— is a single bond or —O—, and the benzene ring c may have a substituent group;

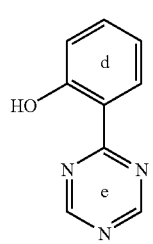
(III)

in which the benzene ring d and the triazine ring e may have a substituent group, and the benzene ring d may be condensed with another aromatic ring or a heterocyclic ring;

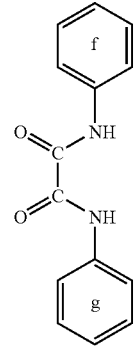
(IV)

in which the benzene rings f and g may have a substituent group;

(V)

in which $Ar^2$ is an aryl group or an aromatic heterocyclic group; $R^1$ is hydrogen or an alkyl group; and each of $R^2$ and $R^3$ independently is cyano, —$COR^{13}$, —$COOR^{14}$, —$CONR^{15}R^{16}$, —$SO_2R^{17}$ or —$SO_2NR^{18}R^{19}$, wherein each of $R^{13}$, $R^{14}$, $R^{15}$, $R^{16}$, $R^{17}$, $R^{18}$ and $R^{19}$ independently is hydrogen, an alkyl group, a substituted alkyl group or an aryl group, or $R^2$ and $R^3$ are combined to form a five-membered or six-membered ring;

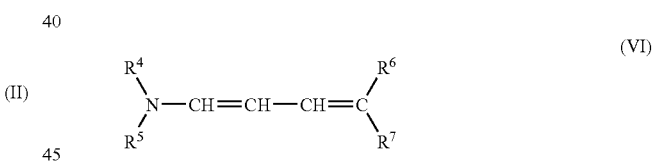
(VI)

in which each of $R^4$ and $R^5$ independently is hydrogen, an alkyl group or an aryl group, or $R^4$ and $R^5$ are combined to form a five-membered or six-membered ring; and each of $R^6$ and $R^7$ independently is cyano, —$COR^{20}$, —$COOR^{21}$, —$CONR^{22}R^{23}$, —$SO_2R^{24}$ or —$SO_2NR^{25}R^{26}$, wherein each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group, or $R^6$ and $R^7$ are combined to form a five-membered or six-membered ring;

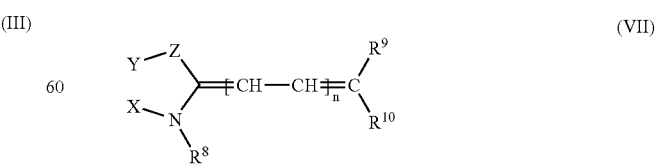
(VII)

in which $R^8$ is an alkyl group, a substituted alkyl group or an aryl group; each of $R^9$ and $R^{10}$ independently is cyano, —$COR^{27}$, —$COOR^{28}$, —$CONR^{29}R^{30}$, —$SO_2R^{31}$ or —$SO_2NR^{32}R^{33}$, wherein each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group, or $R^9$ and $R^{10}$ are combined to form a five-membered or six-membered ring; —X~Y— is —$CR^{34}R^{35}$—$CR^{36}R^{37}$— or —$CR^{38}$=$CR^{39}$—, wherein each of $R^{34}$, $R^{35}$, $R^{36}$, $R^{37}$, $R^{38}$ and $R^{39}$ independently is hydrogen, an alkyl group or an aryl group, or $R^{38}$ and $R^{39}$ are combined to form a benzene or naphthalene ring; —Z— is —O—, —S—, —$NR^{40}$—, —$CR^{41}R^{42}$— or —CH=CH—, wherein $R^{40}$ is an alkyl group, a substituted alkyl group or an aryl group, and each of $R^{41}$ and $R^{42}$ independently is hydrogen or an alkyl group; n is 0 or 1;

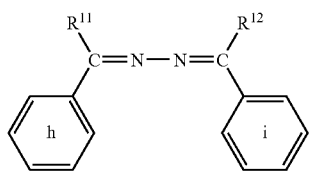 (VIII)

in which each of $R^{11}$ and $R^{12}$ independently is hydrogen, an alkyl group or an aryl group, or $R^{11}$ and $R^{12}$ are combined to form a five-membered or six-membered ring; the benzene rings h and i may have a substituent group; and the benzene rings h and i may be condensed with another aromatic ring or a heterocyclic ring.

5. The plasma display panel as defined in claim 4, wherein the ultraviolet absorbing agent is an o-substituted phenol represented by the formula (I), (II) or (III).

6. The plasma display panel as defined in claim 1, wherein the filter layer contains a dye exhibiting an absorption maximum in the wavelength region of 750 to 850 nm, a dye exhibiting an absorption maximum in the wavelength region of 851 to 950 nm, and a dye exhibiting an absorption maximum in the wavelength region of 951 to 1,100 nm.

7. The plasma display panel as defined in claim 6, wherein each of the dyes is in an aggregated form.

8. The plasma display panel as defined in claim 1, wherein the optical filter further comprises an electromagnetic shielding layer having a surface resistance in the range of 0.1 to 500 $\Omega/m^2$.

9. The plasma display panel as defined in claim 1, wherein the optical filter further comprises an anti-reflection layer giving a reflectance of not more than 3.0%.

* * * * *